(12) United States Patent
Crosby et al.

(10) Patent No.: US 10,144,195 B2
(45) Date of Patent: *Dec. 4, 2018

(54) WEIGHT-BEARING ADHESIVES WITH ADJUSTABLE ANGLES

(71) Applicant: University of Massachusetts, Boston, MA (US)

(72) Inventors: Alfred J. Crosby, Amherst, MA (US); Daniel R. King, Sunderland, MA (US); Michael D. Bartlett, Amherst, MA (US); Duncan J. Irschick, Amherst, MA (US)

(73) Assignee: University of Massachusetts, Boston, MA (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/261,044

(22) Filed: Sep. 9, 2016

(65) Prior Publication Data

US 2016/0375654 A1 Dec. 29, 2016

Related U.S. Application Data

(63) Continuation of application No. 14/172,939, filed on Feb. 5, 2014, now Pat. No. 9,440,416.

(Continued)

(51) Int. Cl.
| | | |
|---|---|---|
| *A47G 1/17* | (2006.01) | |
| *B32B 7/12* | (2006.01) | |
| *B32B 7/02* | (2006.01) | |
| *B32B 7/04* | (2006.01) | |
| *B32B 33/00* | (2006.01) | |
| *B32B 27/28* | (2006.01) | |
| *B32B 27/40* | (2006.01) | |

(Continued)

(52) U.S. Cl.
CPC .................. *B32B 7/12* (2013.01); *B32B 7/02* (2013.01); *B32B 7/04* (2013.01); *B32B 27/283* (2013.01);

(Continued)

(58) Field of Classification Search
CPC .......... A47G 1/168; A47G 1/17; A47G 1/175; F16B 11/006; F16B 47/003; C09J 7/20;
(Continued)

(56) References Cited

U.S. PATENT DOCUMENTS

| 1,739,296 A | 12/1929 | Du Pont |
|---|---|---|
| 2,884,342 A | 4/1959 | Wolff |

(Continued)

FOREIGN PATENT DOCUMENTS

| CN | 1284983 A | 2/2001 |
|---|---|---|
| CN | 1508204 A | 6/2004 |

(Continued)

OTHER PUBLICATIONS

International Search Report and Written Opinion dated Jul. 31, 2012 in connection with Application No. PCT/US2011/057309.

(Continued)

*Primary Examiner* — Carson Gross
(74) *Attorney, Agent, or Firm* — Wolf, Greenfield & Sacks, P.C.

(57) ABSTRACT

The invention provides unique releasable adhesive devices that are high-load bearing and highly stable while allowing adjustment of the weight-bearing angle in a wide range, thereby greatly expanding the scope of applications for technology. Adhesive systems and devices of the invention can be designed to fit applications ranging from household weight-bearing shelves and holders, components for transportation, athletic equipment, labels and advertising posts, automobile interior trims, permanent or reversible fasteners, as well as instruments and devices for industrial, commercial, medical or military applications.

23 Claims, 30 Drawing Sheets

Related U.S. Application Data

(60) Provisional application No. 61/761,292, filed on Feb. 6, 2013.

(51) Int. Cl.
*B32B 37/00* (2006.01)
*C09J 7/00* (2018.01)
*C09J 7/20* (2018.01)
*F16B 47/00* (2006.01)
*F16B 11/00* (2006.01)

(52) U.S. Cl.
CPC ............. *B32B 27/40* (2013.01); *B32B 33/00* (2013.01); *B32B 37/0046* (2013.01); *C09J 7/00* (2013.01); *C09J 7/20* (2018.01); *A47G 1/17* (2013.01); *A47G 1/175* (2013.01); *B32B 2305/08* (2013.01); *B32B 2305/18* (2013.01); *B32B 2307/51* (2013.01); *B32B 2307/748* (2013.01); *B32B 2375/00* (2013.01); *B32B 2383/00* (2013.01); *C09J 2201/626* (2013.01); *F16B 11/006* (2013.01); *F16B 47/003* (2013.01); *Y10T 156/10* (2015.01); *Y10T 428/24025* (2015.01); *Y10T 428/24967* (2015.01); *Y10T 428/2848* (2015.01)

(58) Field of Classification Search
CPC .. C09J 7/21; C09J 2201/606; C09J 2201/618; C09J 2201/626
See application file for complete search history.

(56) References Cited

U.S. PATENT DOCUMENTS

| | | | |
|---|---|---|---|
| 3,653,381 A | 4/1972 | Warnken | |
| 3,691,140 A | 9/1972 | Silver | |
| 4,357,198 A | 11/1982 | Ezquerro | |
| 4,851,076 A | 7/1989 | Manusch et al. | |
| 4,915,768 A | 4/1990 | Soderberg | |
| 4,926,526 A | 5/1990 | Brown et al. | |
| 4,967,740 A | 11/1990 | Riedel | |
| 5,049,416 A * | 9/1991 | Wilczynski | C09J 133/062 427/208.4 |
| 5,269,871 A | 12/1993 | Longwoth et al. | |
| 5,399,219 A | 3/1995 | Roessler et al. | |
| 5,516,581 A | 5/1996 | Kreckel et al. | |
| 5,722,127 A | 3/1998 | Coates | |
| 5,747,131 A | 5/1998 | Kreckel | |
| 5,865,945 A | 2/1999 | McConaughy | |
| 6,045,642 A | 4/2000 | Takeuchi et al. | |
| 6,120,867 A * | 9/2000 | Hamerski | A47G 1/175 428/121 |
| 6,302,177 B1 | 10/2001 | Gruber | |
| 6,403,206 B1 | 6/2002 | Bries et al. | |
| 6,558,789 B1 | 5/2003 | Hamerski et al. | |
| 6,569,521 B1 | 5/2003 | Sheridan et al. | |
| 6,572,945 B2 | 6/2003 | Bries et al. | |
| 6,701,580 B1 | 3/2004 | Bandyopadhyay | |
| 6,737,160 B1 | 5/2004 | Full et al. | |
| 6,872,439 B2 | 3/2005 | Fearing et al. | |
| 6,913,075 B1 | 7/2005 | Knowles et al. | |
| 7,011,723 B2 | 3/2006 | Full et al. | |
| 7,056,409 B2 | 6/2006 | Dubmw | |
| 7,066,182 B1 | 6/2006 | Dunshee | |
| 7,132,161 B2 | 11/2006 | Knowles et al. | |
| 7,144,624 B2 | 12/2006 | Knowles et al. | |
| 7,175,723 B2 | 2/2007 | Jones et al. | |
| 7,181,811 B1 | 2/2007 | Tomanek et al. | |
| 7,229,685 B2 | 6/2007 | Full et al. | |
| 7,762,362 B2 | 7/2010 | Cutkosky et al. | |
| 7,780,810 B2 | 8/2010 | Hamano | |
| 8,108,974 B2 | 2/2012 | Graf | |
| 8,557,378 B2 | 10/2013 | Yamanaka et al. | |
| 9,182,075 B2 | 11/2015 | Crosby et al. | |
| 9,395,038 B2 * | 7/2016 | Crosby | B32B 5/26 |
| 9,440,416 B2 * | 9/2016 | Crosby | B32B 7/02 |
| 9,574,113 B2 | 2/2017 | Crosby et al. | |
| 9,603,419 B2 | 3/2017 | Crosby et al. | |
| 2002/0095130 A1 | 7/2002 | Seitter et al. | |
| 2003/0038408 A1 | 2/2003 | Schulte | |
| 2003/0124312 A1 | 7/2003 | Autumn | |
| 2003/0134112 A1 | 7/2003 | Kreckel et al. | |
| 2003/0232190 A1 | 12/2003 | O'Leary et al. | |
| 2004/0009353 A1 | 1/2004 | Knowles et al. | |
| 2004/0046094 A1 | 3/2004 | Lan | |
| 2004/0076822 A1 | 4/2004 | Jagota et al. | |
| 2005/0112366 A1 * | 5/2005 | Pitzen | A47G 1/175 428/343 |
| 2005/0119640 A1 | 6/2005 | Sverduk et al. | |
| 2005/0148984 A1 | 7/2005 | Lindsay et al. | |
| 2005/0158567 A1 | 7/2005 | Carper et al. | |
| 2005/0181170 A1 | 8/2005 | Fearing et al. | |
| 2006/0078725 A1 | 4/2006 | Fearing et al. | |
| 2006/0202355 A1 | 9/2006 | Majidi et al. | |
| 2007/0232974 A1 | 10/2007 | Serola | |
| 2007/0289786 A1 | 12/2007 | Cutkosky et al. | |
| 2008/0025822 A1 | 1/2008 | Kim et al. | |
| 2008/0164080 A1 | 7/2008 | Asbeck et al. | |
| 2009/0106951 A1 | 4/2009 | Edwards et al. | |
| 2010/0038502 A1 | 2/2010 | Lan | |
| 2010/0044491 A1 | 2/2010 | Ritchey et al. | |
| 2010/0136281 A1 | 6/2010 | Sitti et al. | |
| 2010/0175836 A1 | 7/2010 | Lam | |
| 2010/0221496 A1 | 9/2010 | de Jong | |
| 2012/0204383 A1 | 8/2012 | Wood et al. | |
| 2012/0216949 A1 | 8/2012 | Stachowski et al. | |
| 2013/0273333 A1 | 10/2013 | Meier et al. | |
| 2014/0030490 A1 | 1/2014 | Crosby et al. | |
| 2014/0304953 A1 | 10/2014 | Crosby et al. | |
| 2014/0305569 A1 | 10/2014 | Crosby et al. | |
| 2014/0312188 A1 | 10/2014 | Crosby et al. | |
| 2014/0352881 A1 | 12/2014 | Crosby et al. | |
| 2016/0102804 A1 | 4/2016 | Crosby et al. | |
| 2016/0333228 A1 | 11/2016 | Crosby et al. | |
| 2017/0238660 A1 | 8/2017 | Crosby et al. | |

FOREIGN PATENT DOCUMENTS

| | | |
|---|---|---|
| CN | 1985288 A | 6/2007 |
| CN | 101528169 A | 9/2009 |
| CN | 2013-56127 Y | 12/2009 |
| DE | 4339604 A1 | 5/1995 |
| DE | 20-2010-014239 U1 | 12/2010 |
| EP | 1 710 286 A1 | 10/2006 |
| EP | 1710287 A2 | 10/2006 |
| EP | 2522498 A1 | 11/2012 |
| JP | S48-084865 UA | 1/1972 |
| JP | 55-52721 A | 4/1980 |
| JP | H05-052329 U | 7/1993 |
| JP | 2001-104118 A | 4/2001 |
| JP | 2002-501107 A | 1/2002 |
| JP | 2003-336020 A | 11/2003 |
| JP | 2004-059800 A | 2/2004 |
| JP | 2005-250806 A | 9/2005 |
| JP | 2005-298641 A | 10/2005 |
| RU | 2 381 969 C2 | 2/2010 |
| RU | 111 405 U1 | 12/2011 |
| WO | WO 95/06691 A1 | 3/1995 |
| WO | WO 99/37729 A1 | 7/1999 |
| WO | WO 1999/055791 A1 | 11/1999 |
| WO | WO 2008/019994 A1 | 1/2008 |
| WO | WO 2008/028120 A1 | 3/2008 |
| WO | WO 2011/019511 A2 | 2/2011 |
| WO | WO 2012/078249 A2 | 6/2012 |

OTHER PUBLICATIONS

International Search Report and Written Opinion dated Apr. 25, 2013 in connection with Application No. PCT/US2013/021846.
International Preliminary Report on Patentability dated May 2, 2013 in connection with Application No. PCT/US2011/057309.

(56) References Cited

OTHER PUBLICATIONS

International Search Report dated May 22, 2014 in connection with Application No. PCT/US2014/014755.
International Preliminary Report on Patentability dated Jul. 31, 2014 in connection with Application No. PCT/US2013/021846.
International Search Report and Written Opinion dated Aug. 28, 2014 in connection with Application No. PCT/US2014/028422.
International Search Report dated Aug. 28, 2014 in connection with Application No. PCT/US2014/027392.
No Author Listed, Database WPI Week 201002. Thomson Scientific, London, GB. 2009:XP002742926:1 page.
Bartlett et al., Draping polymer adhesives. Polymer Science and Engineering, University of Massachusetts Amherst Gecko Workshop. Jul. 2010: 1 page.
Bartlett et al., Looking beyond fibrillar features to scale gecko-like adhesion. Adv Mater. 2012;24:1078-1083.
Boesel et al., Gecko-inspired surfaces: a path to strong and reversible dry adhesives. Adv Mater. May 18, 2010;22(19):2125-37. doi: 10.1002/adma.200903200.
Chan et al., Designing model systems for enhanced adhesion. MRS Bulletin. Jun. 2007;32(6):496-503.
Creton et al., Materials science of adhesives: how to bond things together. MRS Bulletin. Jun. 2003;28(6):419-423.
Creton, Pressure-sensitive adhesives: an introductory course. MRS Bulletin. Jun. 2003;28(6):434-439.
Creton et al., Sticky feet: from animals to materials. MRS Bulletin. Jun. 2007;32(6):466-472.
Crosby et al., Adhesive failure analysis of pressure-sensitive adhesives. J Poly Sci Part B: Poly Phys. Dec. 1999;37(24):3455-3472.

\* cited by examiner $$F_c = \sqrt{G_c}\sqrt{\frac{A}{C}}$$

$$C_{post} = \frac{4}{3\mu}\frac{t^3}{bh^3}$$

Add elements by the rules of compliance addition $$F_c = \sqrt{G_c}\sqrt{\frac{(b_1h_1 + b_2h_2 + b_3h_3 + \cdots)}{C_1C_2C_3\cdots/(C_1C_2\cdots + C_2C_3\cdots + C_1C_3\cdots)}}$$

$$= N\sqrt{G_c}\sqrt{\frac{bh}{C}}$$

(e)

WEIGHT-BEARING ADHESIVES WITH ADJUSTABLE ANGLES

PRIORITY CLAIMS AND RELATED PATENT APPLICATIONS

This Application is a continuation and claims the benefit under 35 U.S.C. § 120 of U.S. application Ser. No. 14/172,939, filed on Feb. 5, 2014, which claims the benefit of priority under 35 U.S.C. § 119(e) to U.S. Provisional Application Ser. No. 61/761,292, filed Feb. 6, 2013, each of which is herein incorporated by reference in its entirety.

TECHNICAL FIELD OF THE INVENTION

The invention generally relates to designs, devices, materials and methods useful for weight-bearing. More particularly, the invention relates to adhesive devices that have adjustable angles of weight-bearing hinges, are highly stable, easily released, high load bearing and suitable for extended/repeated use in a variety of applications.

BACKGROUND OF THE INVENTION

Pressure sensitive adhesives (PSAs) are adhesives that form a bond when pressure is applied to marry the adhesive with the adherend. Conventional PSAs have found use in pressure sensitive tapes, labels, note pads, automobile interior trims, and a wide variety of other products. PSAs typically rely on ubiquitous surface force interactions, such as van der Waals forces, to transfer stress across an interface. PSAs can adhere to a surface because the adhesive is soft enough to flow, or wet, the adherend. The adhesive needs to be hard enough to resist flow when stress is applied to the bond at the interface. PSAs exhibit viscoelastic (viscous and elastic) properties, both of which may be used for creating proper bonding.

Conventional PSAs are mainly fabricated from soft, viscoelastic polymer materials (e.g., coatings), which are used either independently or in conjunction with a backing material, such as a stiff film or cloth. To control the level of adhesion, PSAs alter their bulk properties by relying upon a complex formulation of both elastic and viscoelastic components to delicately balance the ability of a material to form an interface (or "wet a surface") and the resistance to separation once the interface is formed. (Benedek, et al. Eds. 2009 *Handbook of Pressure Sensitive Adhesives and Products Series*, CRC Press: Boca Raton; Pocius, 2002, *Adhesion and Adhesives Technology: An Introduction*, Hamer Publ.: Munich; Crosby, et al. 19991 *Poly. Sci. Part B: Polym. Phys.* 37, 24, 3455-3472; Creton, 2003 *"Materials Science of Adhesives: How to Bond Things Together." MRS Bulletin* 28, 6, 419-421; Creton, 2003 *"Pressure-sensitive adhesives: An introductory course." MRS Bulletin* 28, 6, 434-439; Creton, et al. 2007 *"Sticky Feet: From Animals to Materials", MRS Bulletin* 32, 6, all pages; Chan, et al. 2007 *"Designing Model Systems for Enhanced Adhesion." MRS Bulletin* 32, 6, 496-503; Boesel, et al. 2010 *Advanced Materials* 22, 19, 2125-2137.)

Among the various aspects of PSA designs, several factors are typically relevant and emphasized: (1) Conventional PSAs are viscoelastic to allow the polymer coating to conform easily with a rough surface while dissipating mechanical energy (i.e., pressure) that is required for conformality; (2) A measure for strong PSA materials is tack energy, which is the total energy dissipated during the separation of a PSA/substrate interface; (3) High tack PSAs are typically not conducive to multiple loading applications due to the irreversible (i.e. inelastic) materials processes that are used to produce high levels of tack.

Much research has focused on the development of gecko-like adhesive systems, in efforts to overcome some of the disadvantages of conventional PSAs. Some key attributes of both conventional PSAs and ideal gecko-like adhesives are provided in the following table:

| Property | Conventional PSA | Ideal "Gecko-Like" Adhesive |
|---|---|---|
| Max Shear Stress | High | High |
| Max Normal Stress | High | High |
| Peel Resistance | High | Low (after reaching critical peel angle) |
| Energy of Separation | High | Low |
| Reversibility | Limited to None | High |
| Time/Temp Dependence | High | Unknown |
| Impact of Fouling | High | Limited |

Additionally, the adhesive surface of geckos, and similar examples in Nature, is commonly described as "dry", i.e., that adhesion does not rely upon liquid interactions, liquid-to-solid transitions like an epoxy, nor does the adhesive surface feel "tacky" to the touch like a conventional viscoelastic adhesive. Although such attributes are known and displayed in Nature, the primary design factors or mechanisms that permit good control of properties is not known and remains the subject of current research projects worldwide. To our knowledge, the development of a synthetic analog to a gecko-like adhesive has not been demonstrated, in particular one that could be used on macroscopic length scales.

A recent technological breakthrough was a class of elastomer-based adhesive devices that have high load capacity, reusability, easy release and are suitable for extended and repeated use. (See, e.g., WO 2012/078249 (PCT/US2011/057309), which is expressly incorporated herein by reference in its entirety for all purposes.) While the technology substantially advances the state of the art in adhesive technology, there remains a significant and ongoing need for adhesive systems that allow adjustable weight-bearing angles, high-load bearing and highly stable, yet provide simple, non-damaging release and repeated use while being cost-effective to produce.

SUMMARY OF THE INVENTION

The invention provides unique releasable adhesive devices that are high-load bearing and highly stable while allowing adjustment of the weight-bearing angle in a wide range, thereby greatly expanding the scope of applications for technology. Adhesive systems and devices of the invention can be designed to fit applications ranging from household weight-bearing shelves and holders, components for transportation, athletic equipment, labels and advertising posts, automobile interior trims, permanent or reversible fasteners, as well as instruments and devices for industrial, commercial, medical or military applications.

The adhesive devices disclosed herein generally have two or more adhesive pads per device for adhering to one or more target surfaces. The unique designs take into consideration of stiffness, location and degree of freedom in terms of how the adhesive pads, the tether components and weight-bearing mechanisms are interconnected.

In one aspect, the invention generally relates to a releasable, surface-adhesive device. The device includes: a first adhesive pad, a second adhesive pad, a tether component, and a hinge component attached to the tether component. The first adhesive pad includes: a first planar backing layer having high in-plane stiffness; and a first planar layer of an elastic material having a first adhesive surface on at least one side for adhering to a first target surface, wherein the elastic material is impregnated onto the first planar backing layer on at least the side opposing the first adhesive surface. The second adhesive pad includes: a second planar backing layer having high in-plane stiffness (relative to pad compliance); and a second planar layer of an elastic material having a second adhesive surface on at least one side for adhering to a second target surface, wherein the elastic material is impregnated onto the second planar backing layer on at least the side opposing the second adhesive surface. The tether component has a proximal end and a distal end, respectively attached to the first and second planar backing layers. The hinge is rotatable along at least one rotational axis resulting in the hinge component forming an angle with the tether component in the range from about 0° to about 180°.

In another aspect, the invention generally relates to a releasable, surface-adhesive device. The device includes: a planar backing layer having high in-plane stiffness; a first layer of an elastic material having on one side a first adhesive surface for adhering to a target surface and on the other side impregnating into the planar backing layer; a second layer of an elastic material having on one side a second adhesive surface for adhering to a target surface and on the other side impregnating into the planar backing layer; and a hinge attached to the planar backing layer directly or via a rigid substrate.

In yet another aspect, the invention generally relates to a method for releasably holding a weight. The method includes: providing a releasable, surface-adhesive device according to disclosed; and attaching a weight to the device.

DETAILED DESCRIPTION OF THE INVENTION

The invention provides unique releasable adhesive devices, as well as related methods, that simultaneously enable adherence to two or multiple target surfaces of various nature, which enables reusability, easy-release, and high load capacities for extended and repeated use. Adhesive systems and devices of the invention may be designed to fit a variety of utilities (e.g., household weight-bearing shelves and holders, components for transportation, athletic equipment, labels and advertising posts, automobile interior trims, permanent or reversible fasteners, as well as instruments and devices for industrial, commercial, medical or military applications).

The invention differs from prior art in the field of PSAs at least in that the present invention does not rely on viscoelastic properties to achieve performance controls, as do PSAs. Designs and systems of the invention allow separation time and energy to be minimized, while maintaining the ability to support extremely high-weight loads. In contrast to prior art in the development of gecko-type adhesives, the designs, systems and methods disclosed herein do not require the use of surface fibrillar structures to achieve desired attributes. Following the principles disclosed herein, one may mimic the engineering design of the toe and leg structures of common examples in Nature, such as geckos in vertical climbing. Other key differences between the present invention and the prior art relate to, among others, the specific designation of rotational freedom at continuous junctions, specifications of stiffness in loading direction with low flexural rigidity perpendicular to surface of elastic material, and the ability to achieve high capacity load support under both normal and shear loading directions with near-zero required "pre-load" (referring to the amount of force that is required to establish the adhesive/substrate interface for supporting a given load).

As a component of the present invention, the adhesive pad system utilized herein employs a "dry" adhesive pad structure (sometimes referred to as a "T-pad"). The basic structure of the adhesive device is referred to as a "pad", which is subsequently connected to a tether (e.g., a synthetic fabric tether, sometimes referred to as "tendon"). The tether should maintain high stiffness along the primary axis of loading. The connection between the tendon and the pad has predefined dimensions, orientation, and spatial location, according to particular needs, that can be modified to control the release strategy and provide tolerated balance of shear and normal loading. Properly designed, the adhesive pad device can support high loads under shear, normal, and multi-mode (i.e., peel) loadings while requiring minimal forces and energy for release (or separation) under specifically-designed release strategies.

Figure 1:
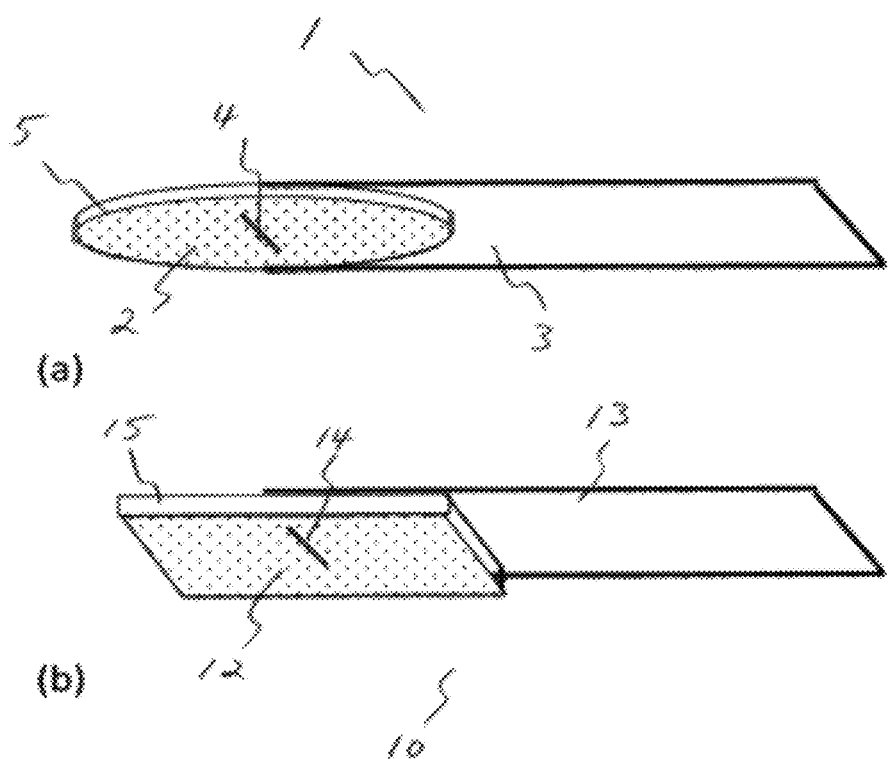
FIG. 1 shows schematic illustrations of exemplary embodiments of adhesive pads.

Two exemplary embodiments of adhesive pad devices are schematically illustrated in FIG. 1, wherein (a) depicts an adhesive pad 1 having an adhesive surface 2 of a circular outer boundary 5. The adhesive pad is connected to a tether component 3 at line 4. Similarly, (b) depicts an adhesive pad 10 having an adhesive surface 12 of a rectangular outer boundary 15. The adhesive pad is connected to a tether component 13 at line 14.

Figure 2:
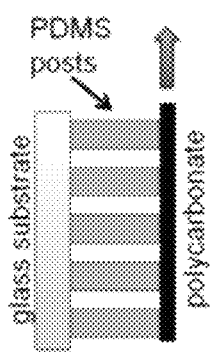
FIG. 2 shows certain design factors and schematic illustrations.
Figure 2:
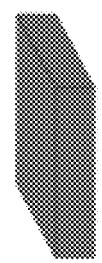
Figure 2:
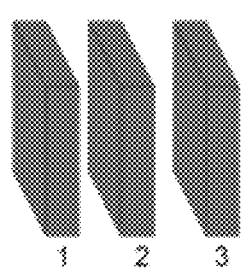
Figure 3:
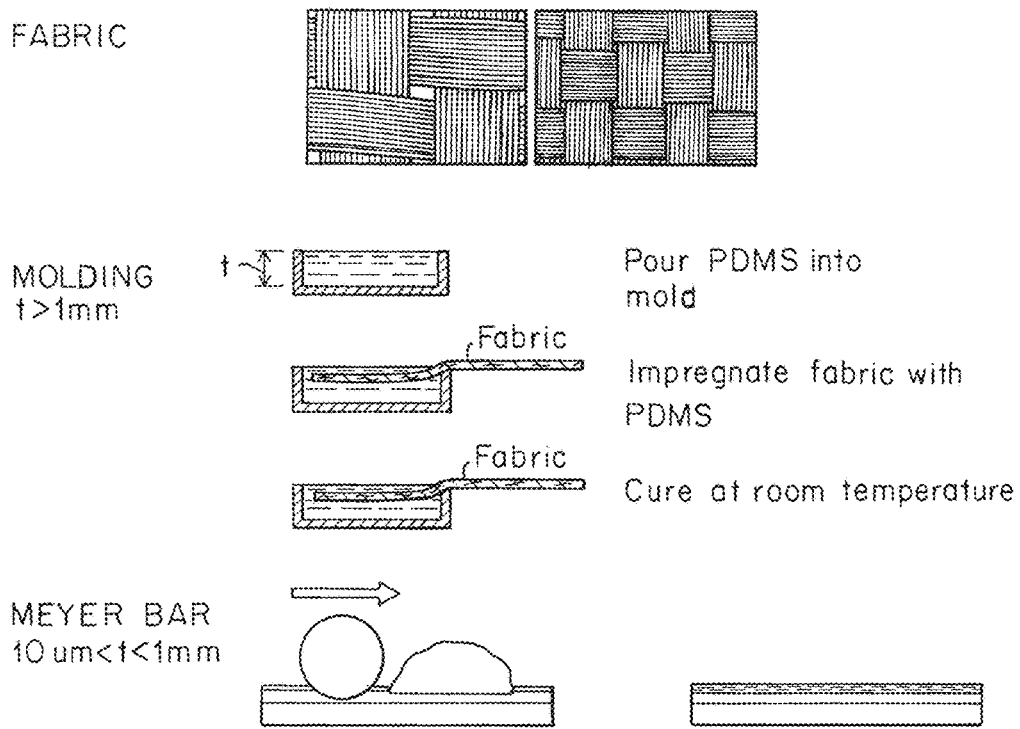
FIG. 3 shows a schematic illustration of an exemplary fabrication process.

Such adhesive pad design represents a unique combination of adhesion attributes of polymer materials and integrated mechanical designs through proper conservation of rotational freedom, low flexural modulus normal to the adhesive interface, and high stiffness in load bearing directions. A scaling relationship has been developed by the inventors to provide a framework for understanding the adhesive performance of the materials devices over a range of size scales and geometries (FIG. 2). This scaling relationship suggests that the adhesive capacity ($F_C$) of an interface is governed by three simple parameters, which are dependent on both the geometry and material properties of the interface. To design reversible adhesives which can adhere to various substrates, the interfacial interactions ($G_C$) should rely upon non-specific van der Waals forces, rendering $G_C$ an ineffective control parameter. Therefore, to scale $F_C$ for adhesive materials the material system must not just rely on area on contact (A) or the system compliance (C) but must develop attributes that increase the A/C ratio. This presents a challenge; materials must be soft to increase true contact but stiff to achieve high loads. Soft materials are able to create large-scale contact but have a high compliance when loaded, while stiff materials are unable to create extensive contact; both cases result in a null effect on the A/C ratio. The current invention provides a mechanism for maximizing A/C, and most importantly, tuning this governing parameter for different applications. As schematically illustrated in FIG. 3, an efficient and effective fabrication method may be used to fabricate the T-pad. The method involves integrating a thin layer of an elastic elastomer into a surface of a fabric.

The tether can be connected to the adhesive pad through any suitable methods, such as conventional sewing, stitching, or gluing, which allows easy control of dimensional, orientational, and spatial location of the attachment. The attachment should provide sufficient load sharing and load bearing capacity, which can be controlled through the stitching pattern, width, and length. Appropriate stitching patterns include straight stitching, zigzag stitching, multi zigzag stitch, satin stitching, honeycomb stitching, ladder stitch, double overlock stitch, and criss-cross stitching.

For example, a particularly advantageous tether-pad connection is a straight-line stitch that is centered on the one axis of the pad and extends to a length of approximately ⅔ the chord length perpendicular the second pad axis. The tether-pad connection should maintain rotational freedom while maintaining high stiffness in the direction of loading. The tether-pad connection should preferably maintain equal load sharing along the entire length of the connection.

One adhesive pad can act independently or in conjunction with an array of adhesive pads or units (sometimes referred to as a "T-surface"), which may be mounted with rotationally-free joints to a supporting substrate that can be rigid in one or more directions, for example. For certain applications, e.g., a large weight bearing shelf, multiple attachment points for the tether to the adhesive pad may also be employed.

Figure 4:
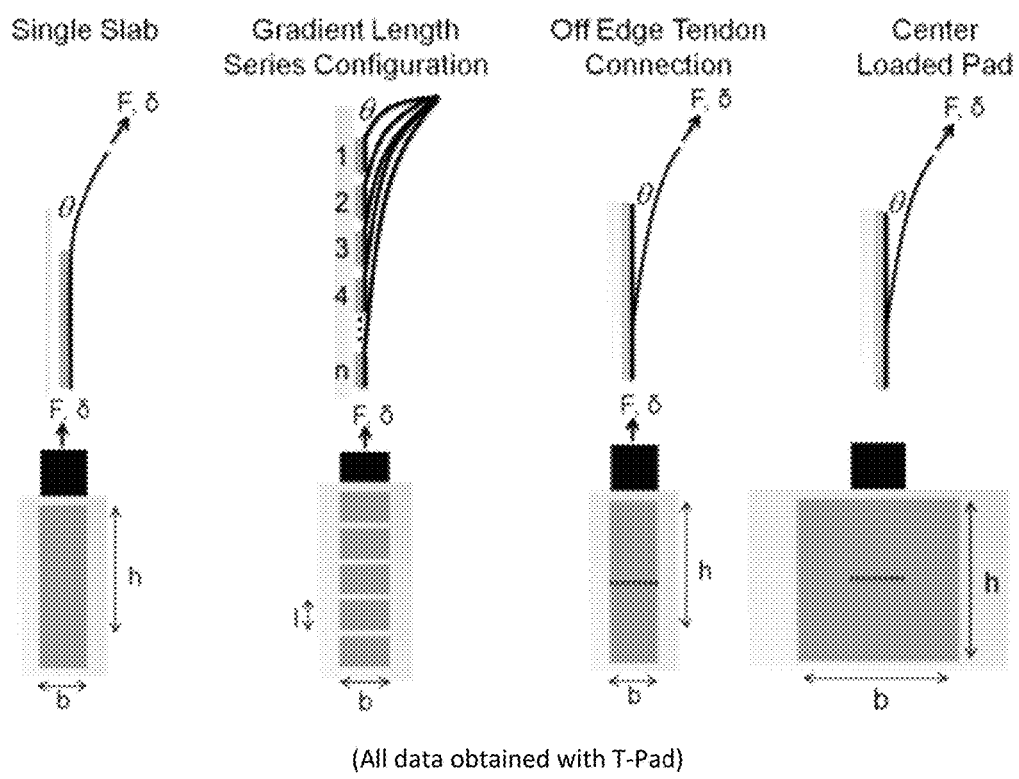
FIG. 4 shows schematic illustrations of various embodiments of the invention for the pad-tether connection.

FIG. 4 shows schematic illustrations of various adhesive pad configurations for the tether-pad connection. A single slab connection constitutes a continuous adhesive pad and support backing, which can then be divided into a larger number of discrete adhesive pads and support backings in which multiple tendons are used to create different configurations (e.g., a gradient length series configuration). The tether attached to the adhesive pad allows for adjustment of the angle between the tether and the adhesive pad from about 0° to about 359° (e.g., 30°, 45°, 60°, 90°, 120°, 150°, 180°, 210°, 240°, 270°, 300°, 330°).

Figure 5:
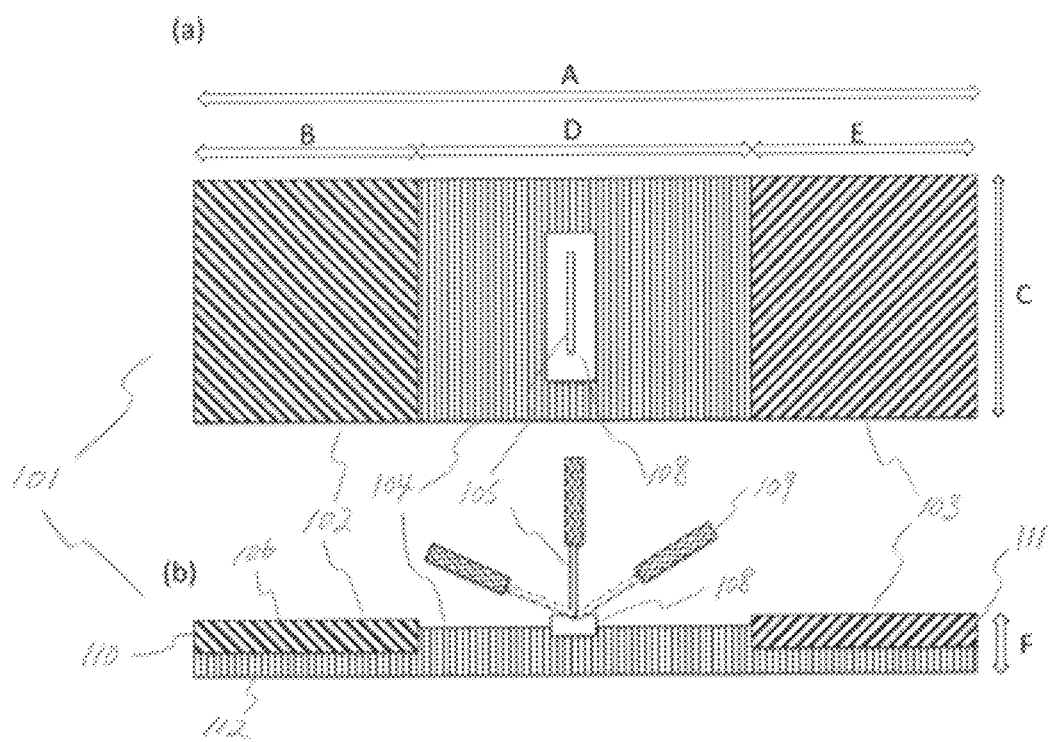
FIG. 5 shows schematic illustrations of an exemplary embodiment of a dual-pad adhesive device according to the invention.

Referring to FIG. 5, a schematic illustration of an exemplary embodiment of a dual-pad adhesive device having adjustable weight-bearing angle is shown in a top view (a) and a side view (b). The adhesive device 101 includes a first adhesive pad 102, a second adhesive pad 103, a tether component 104, and a hinge component 105 attached to the tether component 104. A tendon component 109 is attached to the hinge component 105. The tendon component may be a modular easily releasable/replaceable from the hinge 105.

As an exemplary embodiment, the first adhesive pad 102 is in a rectangular shape with dimensions B×C×F. The second adhesive pad 103 is in a rectangular shape with dimensions E×C×F. It is noted that the first and second adhesive pads need not be identical in shape, and that dimensions and/or material composition may be individually designed to meet particular needs. Furthermore, the tether component 104 may have the same or different width as that of either or both of the first and second adhesive pads 102 and 103.

The first adhesive pad 102 has a first adhesive layer 110 having a first adhesive surface 106 and a first backing layer 112. The second adhesive pad 103 has a second adhesive layer 111 having a second adhesive surface 107 and a second backing layer 113. Hinge 105 is anchored on a base 108. Hinge 105, which may be made of a rigid material or a non-rigid material depending on the need, is attached to the base 108 such that hinge 105 is capable of adjusting its angle with the surface of the tether component 104 from about 0° to about 180°. The first backing layer 112, the tethering component 104, and the second backing layer 113 form a continuous layer.

As shown in FIG. 5, the first and second adhesive surfaces 106 and 107 face the same side of tether component 104—as the hinge 105 does. As discussed herein, the hinge 105 may be placed on the other side of the tether component 104 (see, e.g., FIG. 7). When in use, the first and second adhesive surfaces are applied to the target surface(s). The hinge 105 is available for holding weight or for connections to other weight-bearing components.

Figure 6A:
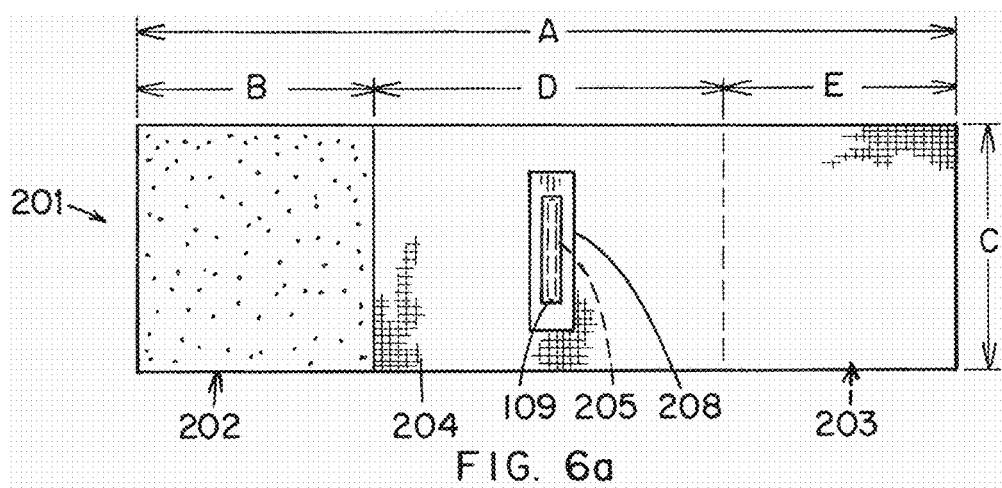
FIGS. 6a and 6b show schematic illustrations of an exemplary embodiment of a dual-pad adhesive device according to the invention.
Figure 6B:
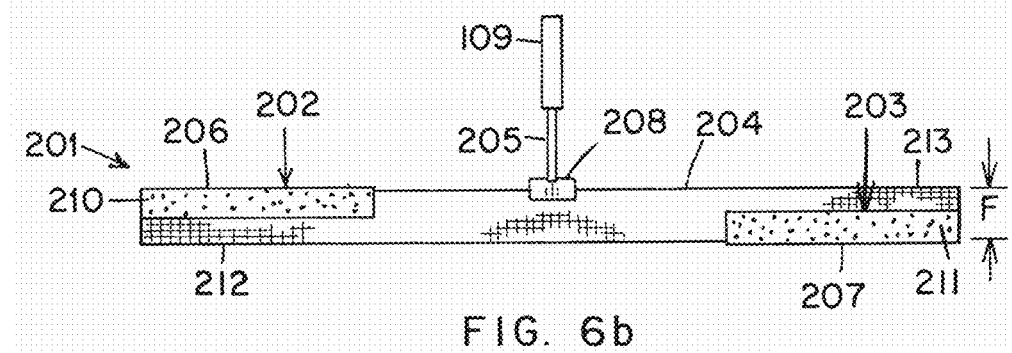

Referring to FIGS. 6a and 6b, another exemplary embodiment of a dual-pad adhesive device having adjustable weight-bearing angle is shown in a top view (a) and a side view (b). The adhesive device 201 includes a first adhesive pad 202, a second adhesive pad 203, a tether component 204, and a hinge component 205 attached to the tether component 204.

The first adhesive pad 202 has a first adhesive layer 210 having a first adhesive surface 206 and a first backing layer 212. The second adhesive pad 203 has a second adhesive layer 211 having a second adhesive surface 207 and a second backing layer 213. The hinge 205 is anchored on a base 208. Hinge 205 is attached to the base 208 such that hinge 205 is capable of adjusting its angle with the surface of the tether component 204 from about 0° to about 180°. The first backing layer 212, the tethering component 204, and the second backing layer 213 form a continuous layer.

As shown in FIGS. 6a and 6b, the first and second adhesive surfaces 206 and 207 face different sides of tether component 204. When in use, the first and second adhesive surfaces are applied to the target surfaces. The hinge 205 is available for holding weight or for connections to other weight-bearing components.

Figure 7A:
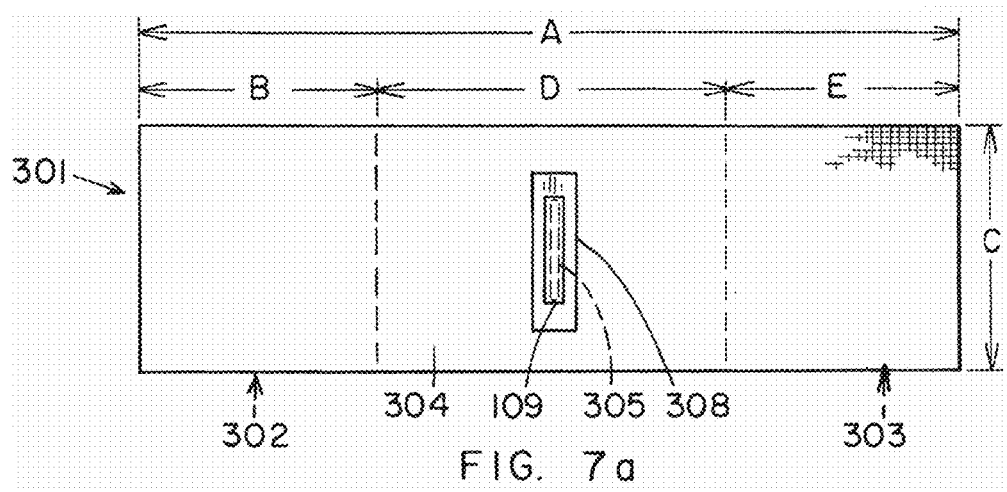
FIGS. 7a and 7b show schematic illustrations of an exemplary embodiment of a dual-pad adhesive device according to the invention.
Figure 7B:
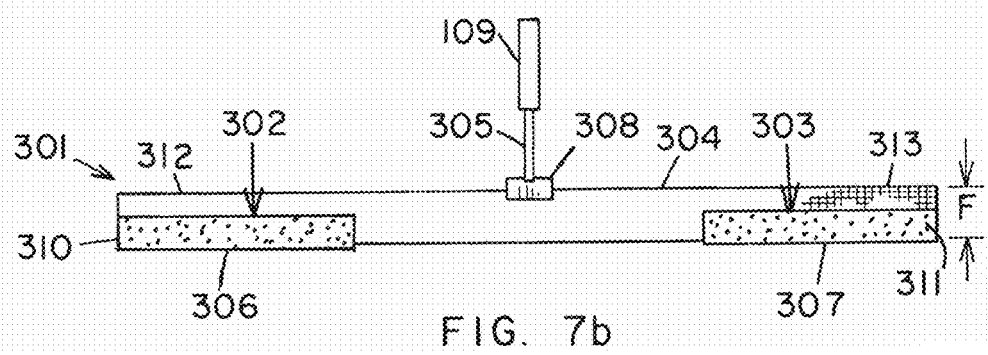

FIGS. 7a and 7b schematically illustrate yet another exemplary embodiment of a dual-pad adhesive device having adjustable weight-bearing angle of the invention in a top view (a) and a side view (b). The adhesive device 301 includes a first adhesive pad 302, a second adhesive pad 303, a tether component 304, and a hinge component 305 attached to the tether component 304.

The first adhesive pad 302 has a first adhesive layer 310 having a first adhesive surface 306 and a first backing layer 312. The second adhesive pad 303 has a second adhesive layer 311 having a second adhesive surface 307 and a second backing layer 313. The hinge 305 is anchored on a base 308 such that hinge 305 is capable of adjusting its angle with the surface of the tether component 304 from about 0° to about 180°. The first backing layer 312, the tethering component 304, and the second backing layer 314 form a continuous layer.

As shown in FIGS. 7a and 7b, the first and second adhesive surfaces 306 and 307 face the same side of tether component 304 and are on the opposite side of the hinge 305. When in use, the first and second adhesive surfaces are applied to the target surface(s). The hinge 305 is available for holding weight or for connections to other weight-bearing components.

Figure 8:
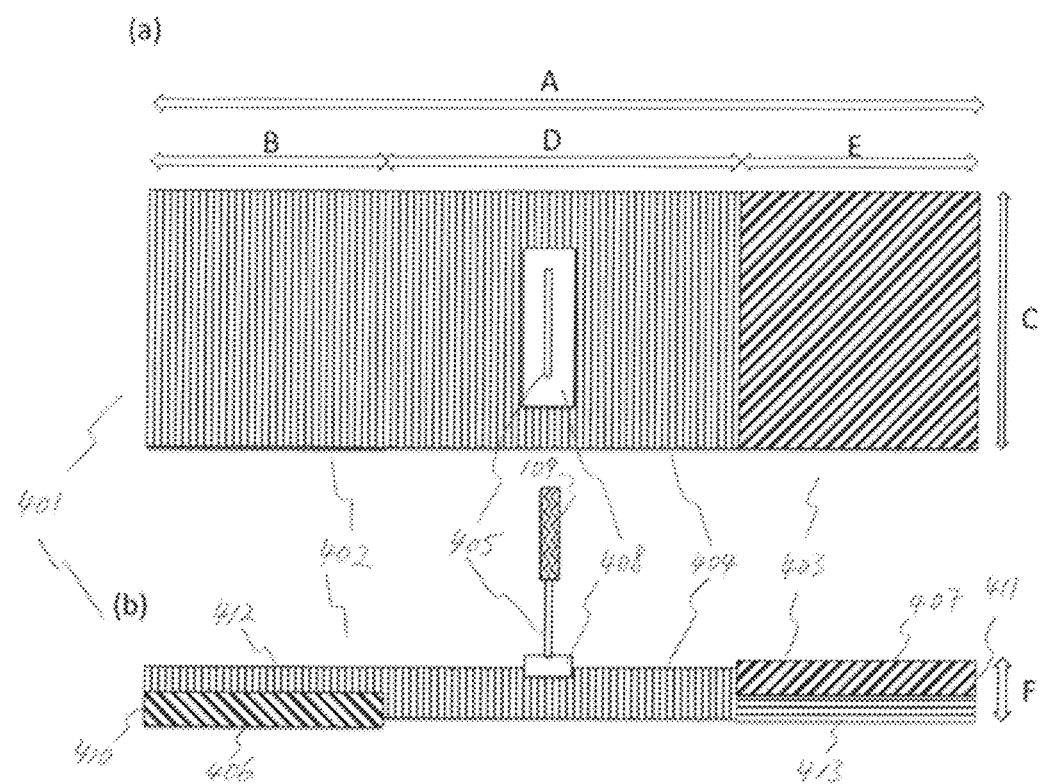
FIG. 8 shows schematic illustrations of an exemplary embodiment of a dual-pad adhesive device according to the invention.
Figure 9:
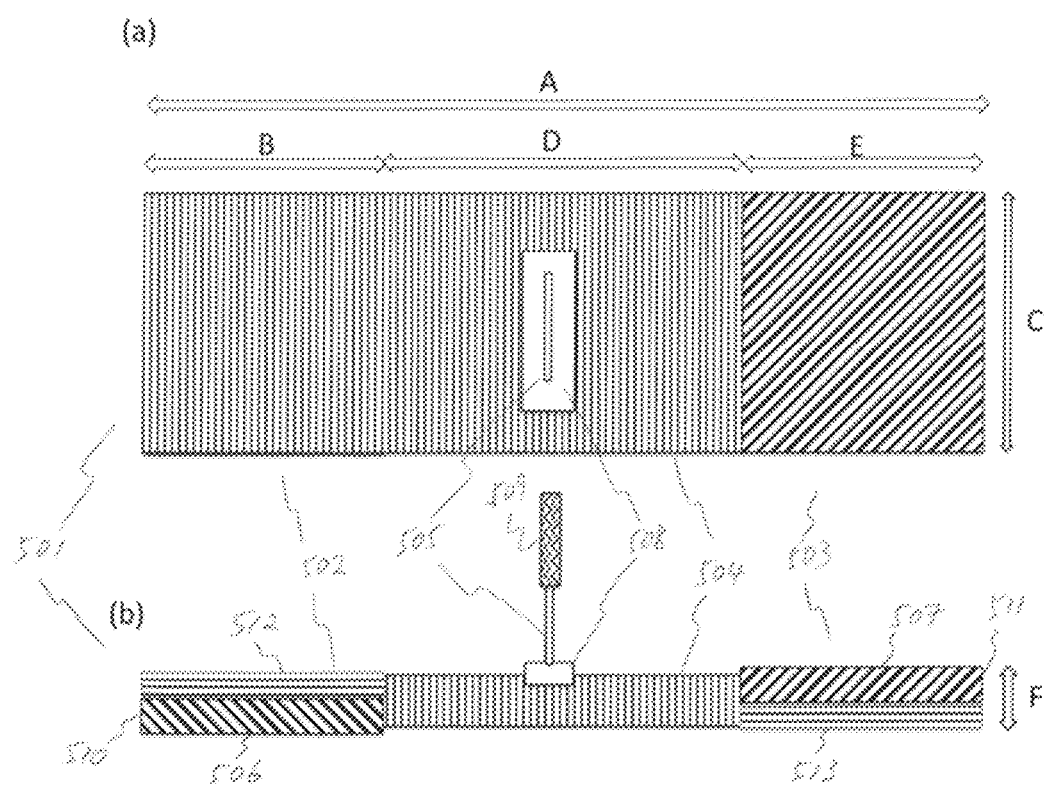
FIG. 9 shows schematic illustrations of an exemplary embodiment of a dual-pad adhesive device according to the invention.
Figure 10:
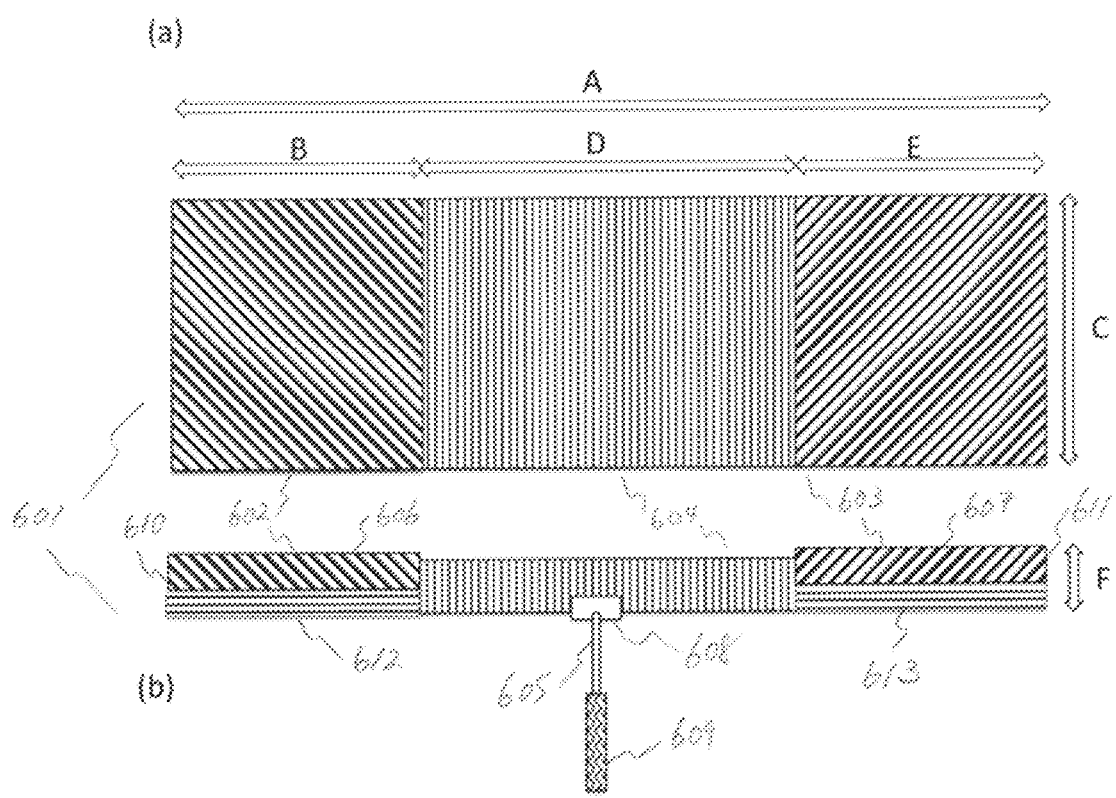
FIG. 10 shows schematic illustrations of an exemplary embodiment of a dual-pad adhesive device according to the invention.

In the exemplary embodiments shown in FIGS. 5-7b, the first and second backing layers and the tether component together form a continuous layer. An alternative embodiment includes that illustratively shown in FIG. 8, where the first backing layer 412 and the tethering component 404 form a continuous layer but they do not form a continuous layer with the second backing layer 413. Yet another alternative embodiment includes that illustratively shown in FIG. 9, where the first backing layer 512 and the tethering component 504 do not form a continuous layer and neither forms a continuous layer with the second backing layer 513. Similarly in FIG. 10, the first backing layer 612 and the tethering component 604 do not form a continuous layer and neither forms a continuous layer with the second backing layer 613.

Figure 11:
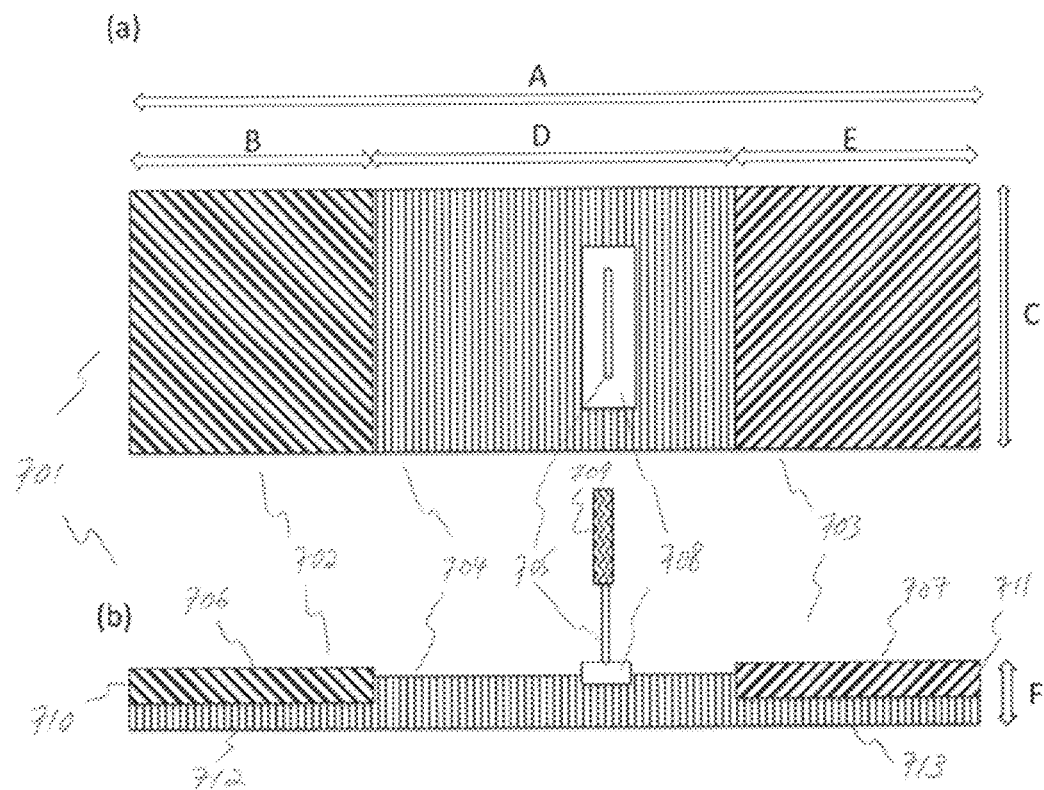
FIG. 11 shows schematic illustrations of an exemplary embodiment of a dual-pad adhesive device according to the invention.
Figure 12:
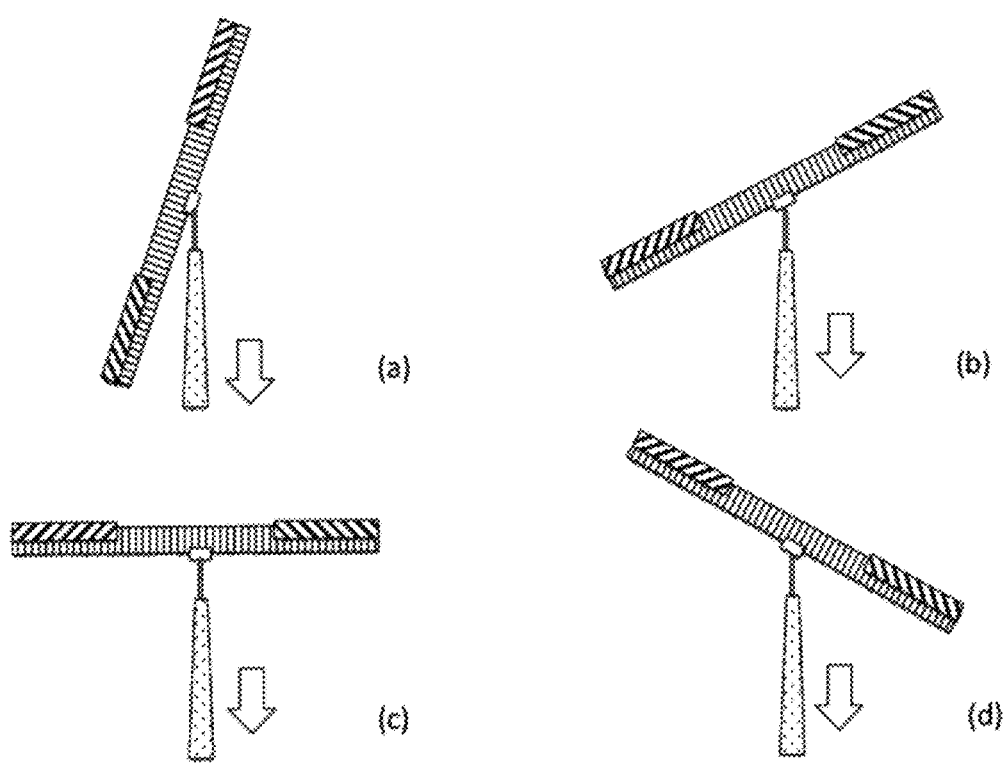
FIG. 12 schematically depicts adjustable weigh-bearing angles of an exemplary dual-pad adhesive device according to the invention.

Referring to FIG. 11, a hinge 705 is positioned on a tether component 704 away from the center (midway) between the first and second adhesive pads 702 and 703. This is in contrast to the designs illustrated in FIGS. 5-10, wherein the hinge is substantially midway between the first and second adhesive pads. It is noted that the hinge may be attached at any position of the tether component dependent on the applications, including substantially at the center or midway between the adhesive pads, off-center, or substantially away from the center. It is further noted that by modifying the location of the hinge in relation to the adhesive pads, one is able to adjust the relative portions of weigh-bearing each adhesive pad is to share.

Referring to FIG. 12(a)-(d), the hinge of the dual-pad adhesive device allows the angle between the adherent surface and the direction of the hinge (e.g., the direction of the weigh-bearing force) to be adjustable in a wide range, e.g., from about 0° to about 180°.

Figure 13:
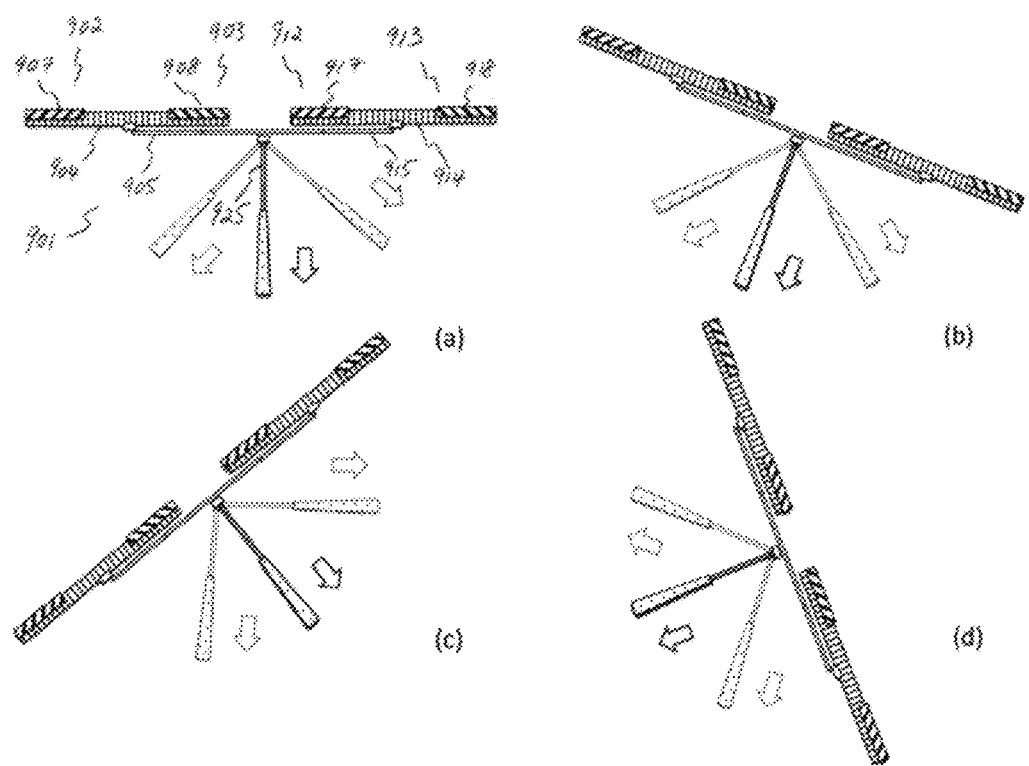
FIG. 13 schematically depicts exemplary embodiments of multiple (e.g., 4 or 5) adhesive-pad assemblies having adjustable weigh-bearing angles according to the invention.
Figure 13:
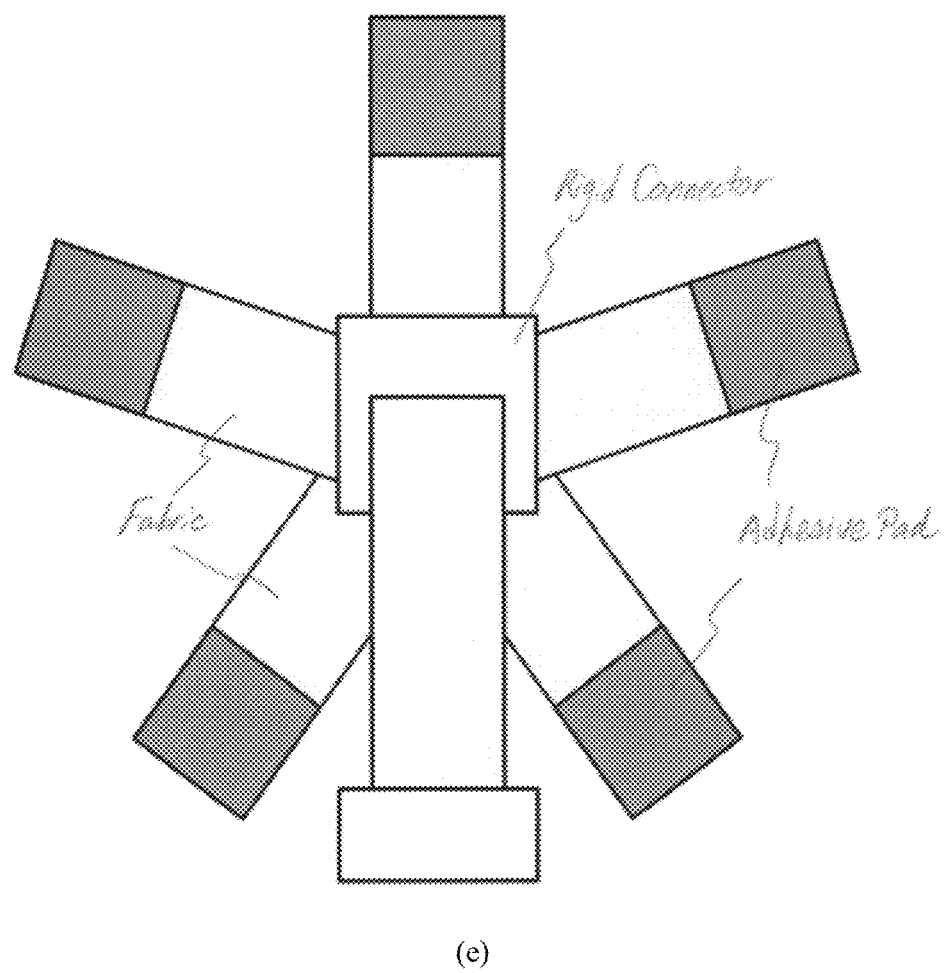

The dual-pad adhesive system of the invention may be configured into an assembly or set of two or more depending on the applications. For example, as schematically illustrated in FIG. 13(a), two dual-pad adhesive systems are assembled into a device 901. The device 901 includes four adhesive pads, 902, 903, 912 and 913, which exhibit adhesive surfaces 907, 908, 917 and 918, respectively. As shown in FIG. 13(a), the first hinge 905 is attached to the first tether component 904 while the second hinge 915 is attached to the second tether component 914. The first and second hinges 905 and 915 are joined and a third hinge 925 is attached thereto, which is capable of weight-bearing directly or through an intermediate mechanism.

Figure 14A:
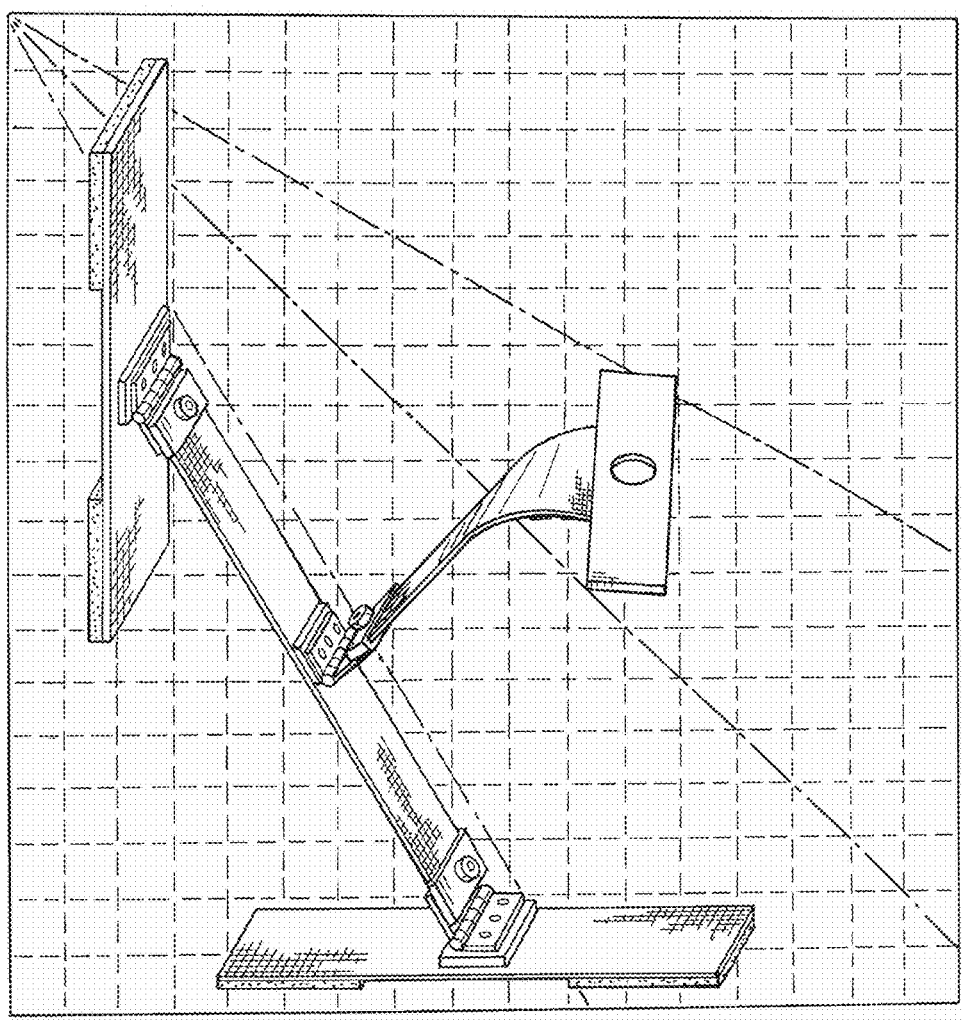
FIGS. 14a and 14b show an exemplary embodiment of a four adhesive-pad assembly having adjustable weigh-bearing angles according to the invention.
Figure 14B:
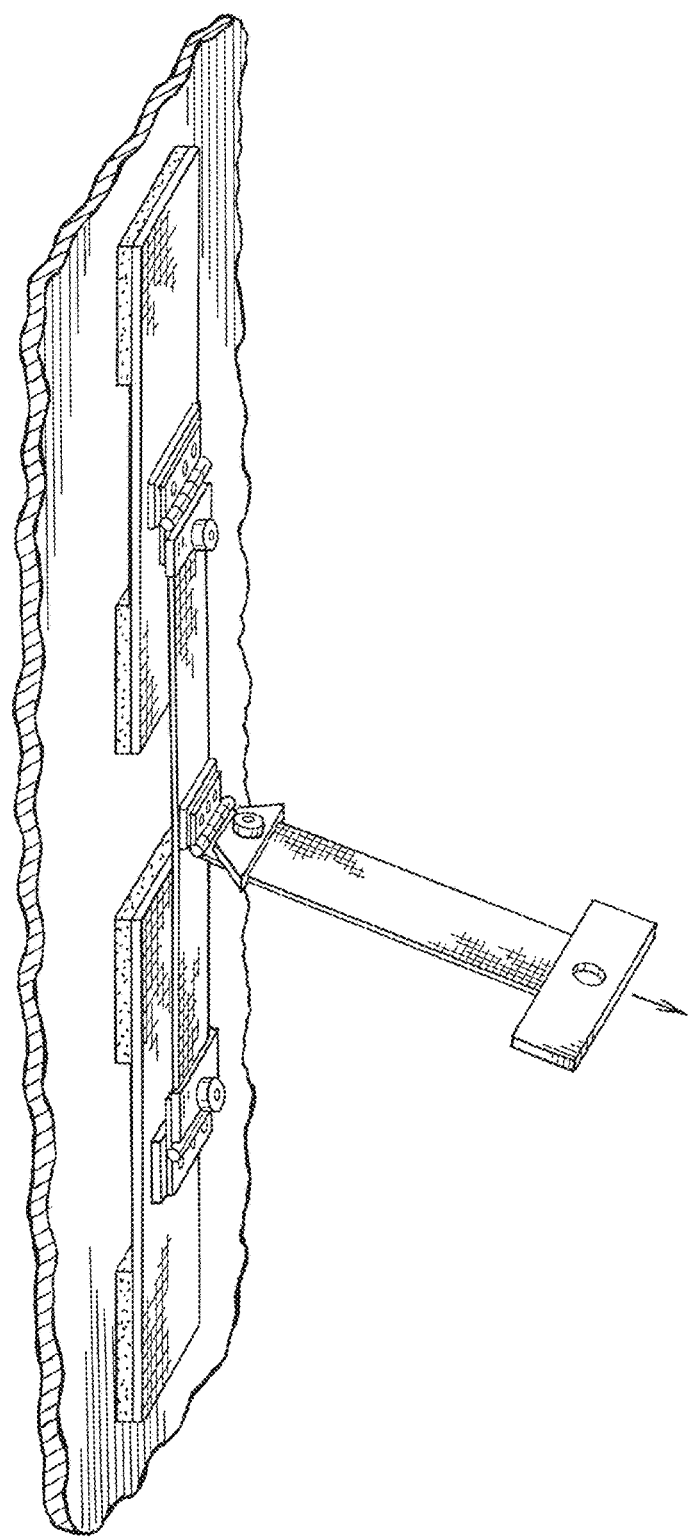

Similar to the other embodiments discussed herein, the third hinge 925 is capable of being adjusted in a wide range of angles from about 0° to about 180°. An example of a device having such an assembly is shown in FIGS. 14a and 14b.

Other exemplary embodiments include configurations where multiple adhesive pads (e.g., 3, 4, 5 or more) are arranged around a circular or other shaped perimeter, as schematically illustrated in FIG. 13(e), which depicts a circular adhesive system including five adhesive pads extending from a centrally located joint. In FIG. 13(e), blue denotes Adhesive Pad, gray denotes fabric, and white denotes rigid connector.

Figure 15A:
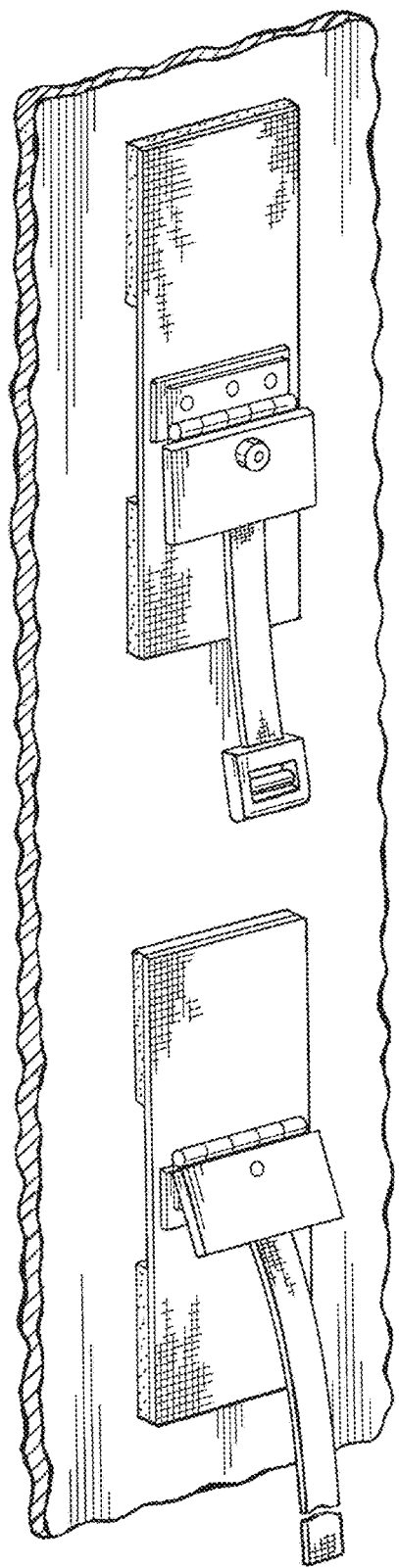
FIGS. 15a and 15c show an exemplary embodiment of a dynamic, four adhesive-pad assembly having adjustable weigh-bearing angles according to the invention.
Figure 15B:
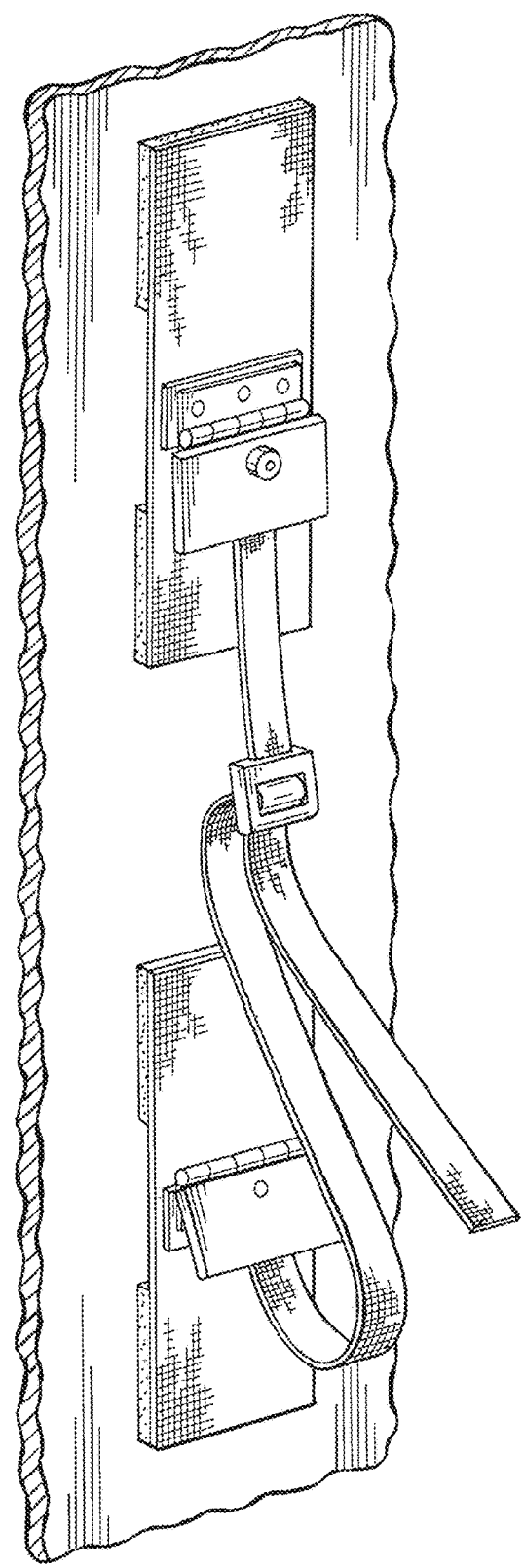
Figure 15C:
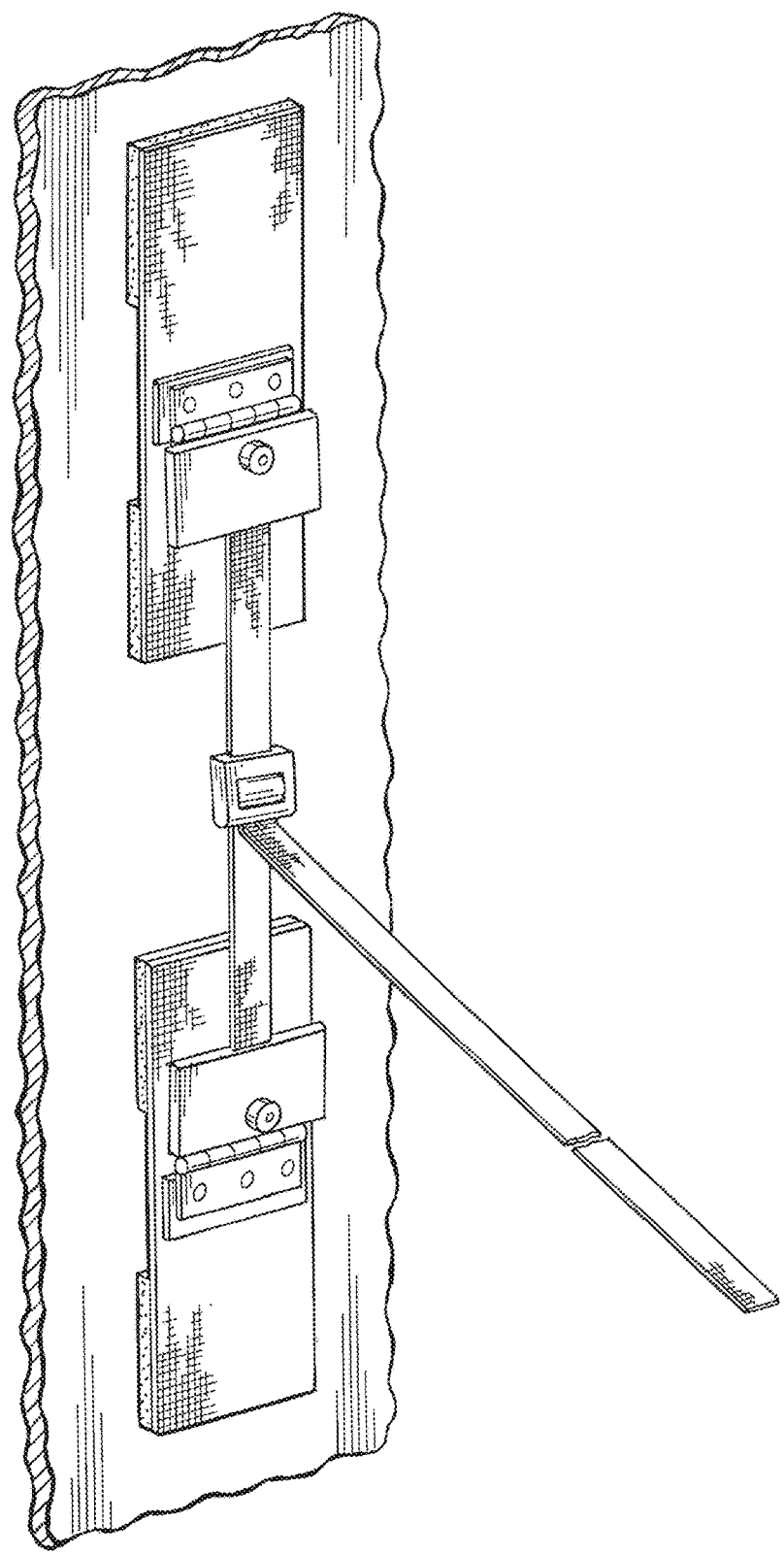

In connecting the first hinge 905 with the second hinge 915, a dynamic approach may be adopted wherein a tension is created by pulling the two toward each other. A mechanism may be included (e.g., shown in FIGS. 15a, 15b and 15c), which allows a gradual and controlled introduction and building of tension.

Figure 16:
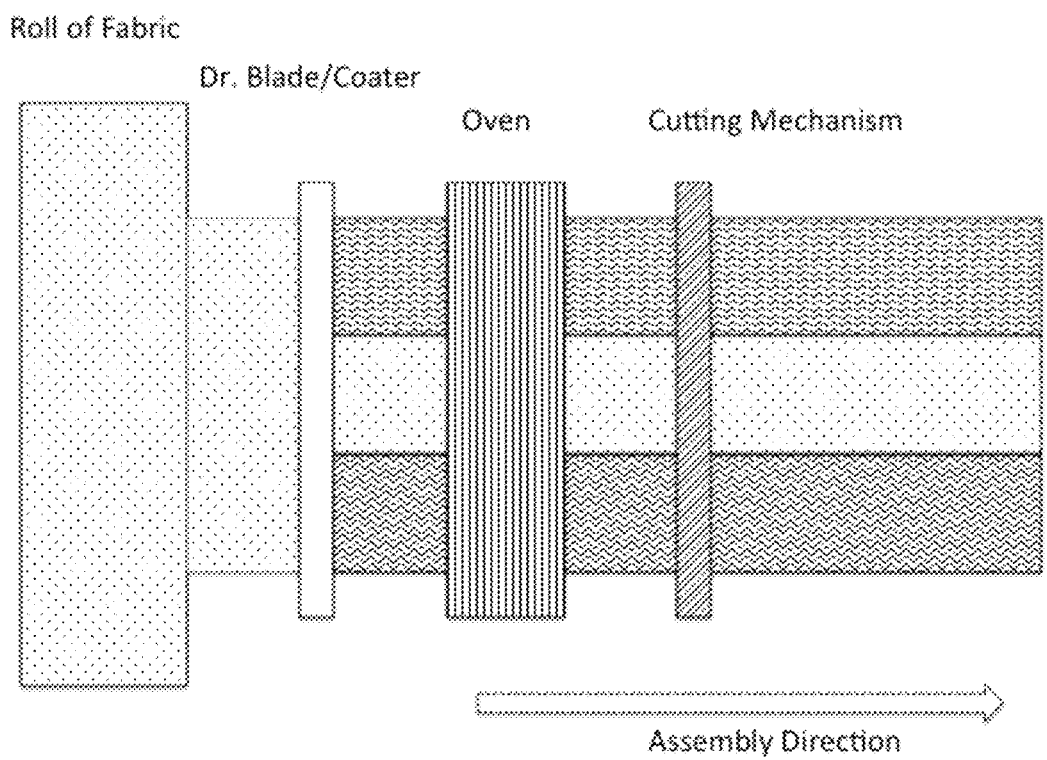
FIG. 16 schematically shows an exemplary assembly line roll-to-roll process for creating complex skin systems.
Figure 17A:
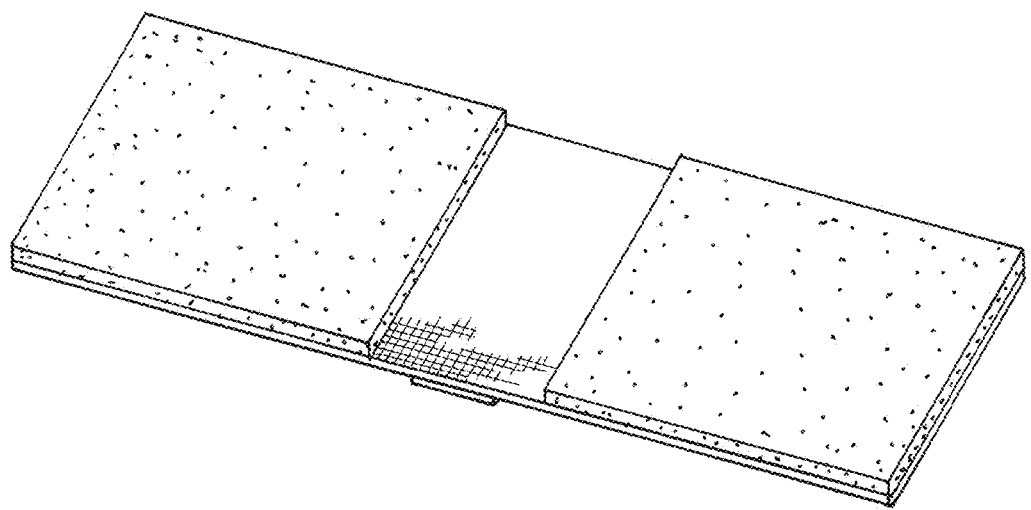
FIGS. 17a and 17b show exemplary (top) results of a face down molding method and (bottom) back of the complex skin system, showing a rigid piece of polycarbonate with a metal hinge chemically attached.
Figure 17B:
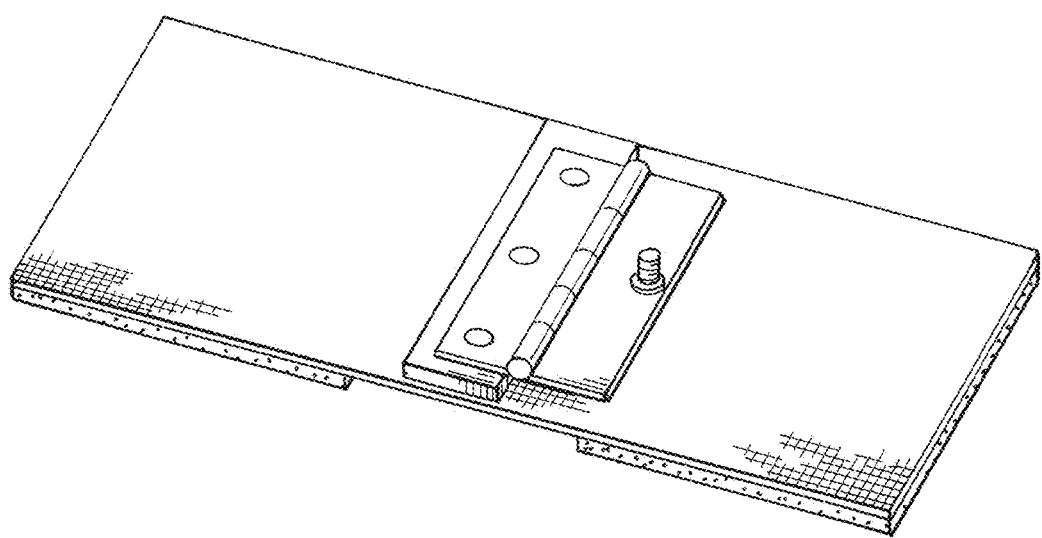
Figure 18:
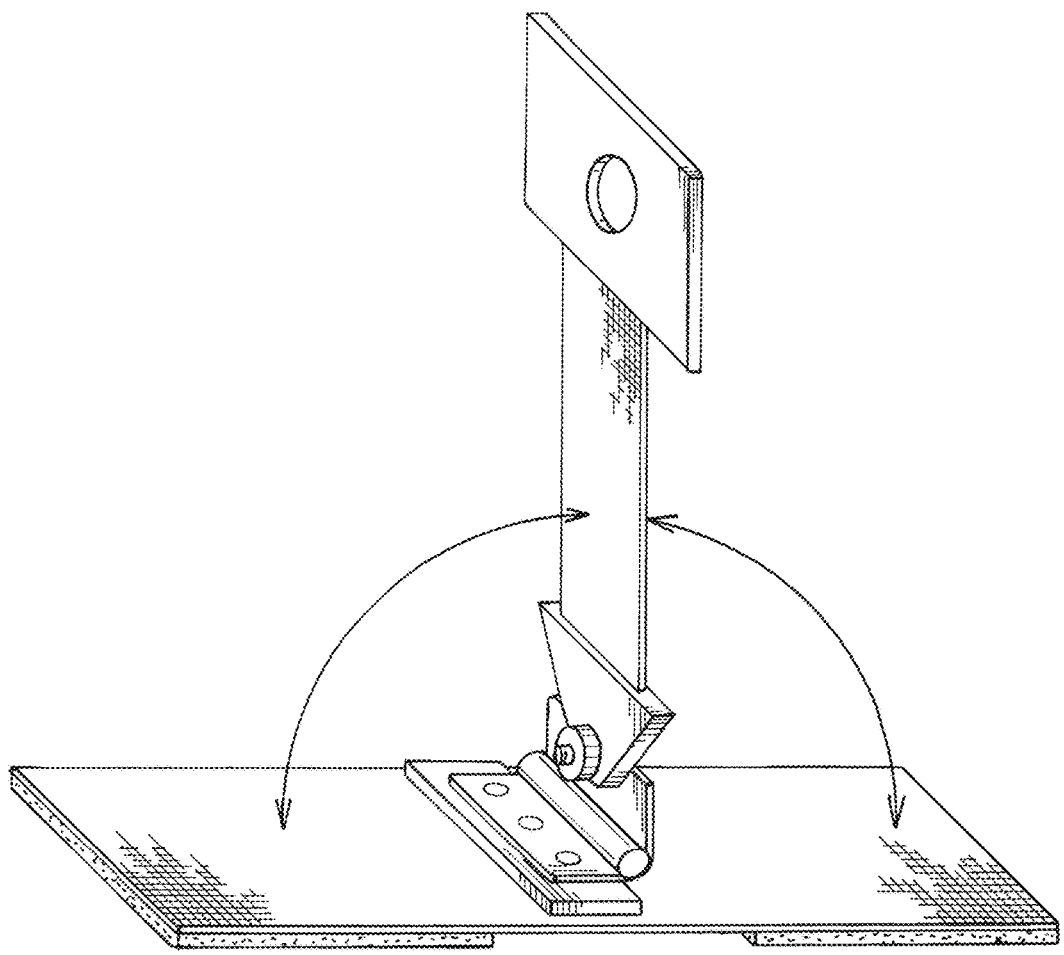
FIG. 18 shows an exemplary dual-pad adhesive device according to the invention.
Figure 19:
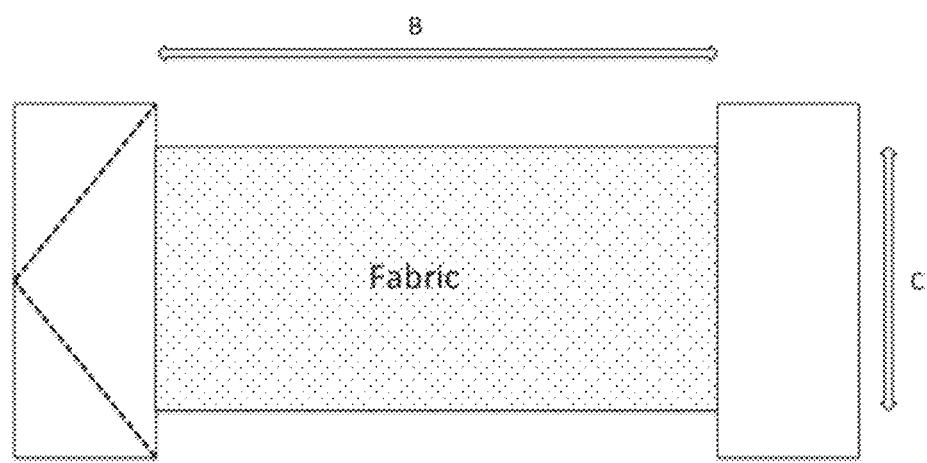
FIG. 19 schematically depicts an exemplary method for making a modular tendon.
Figure 20:
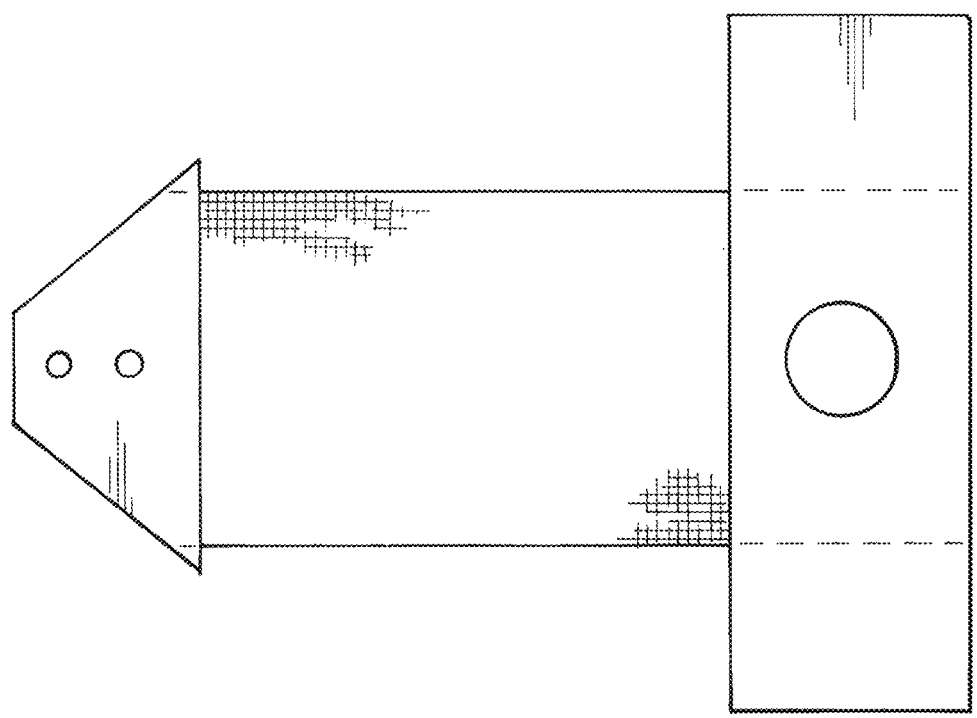
FIG. 20 shows an exemplary modular tendon with a large hole drilled for hanging.
Figure 21:
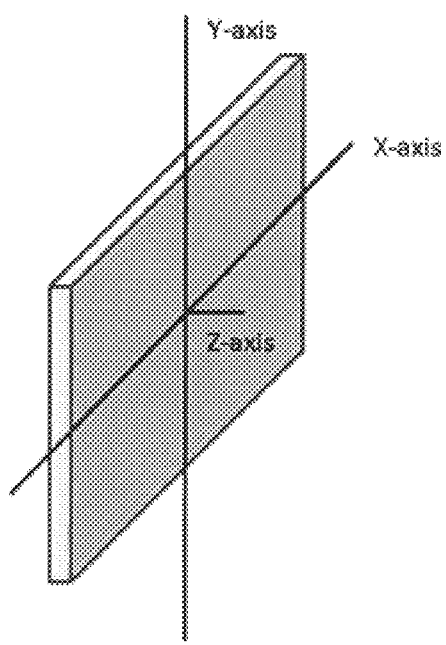
FIG. 21 shows a schematic illustration of available axes of rotation.
Figures 22A, 22B, 22C:
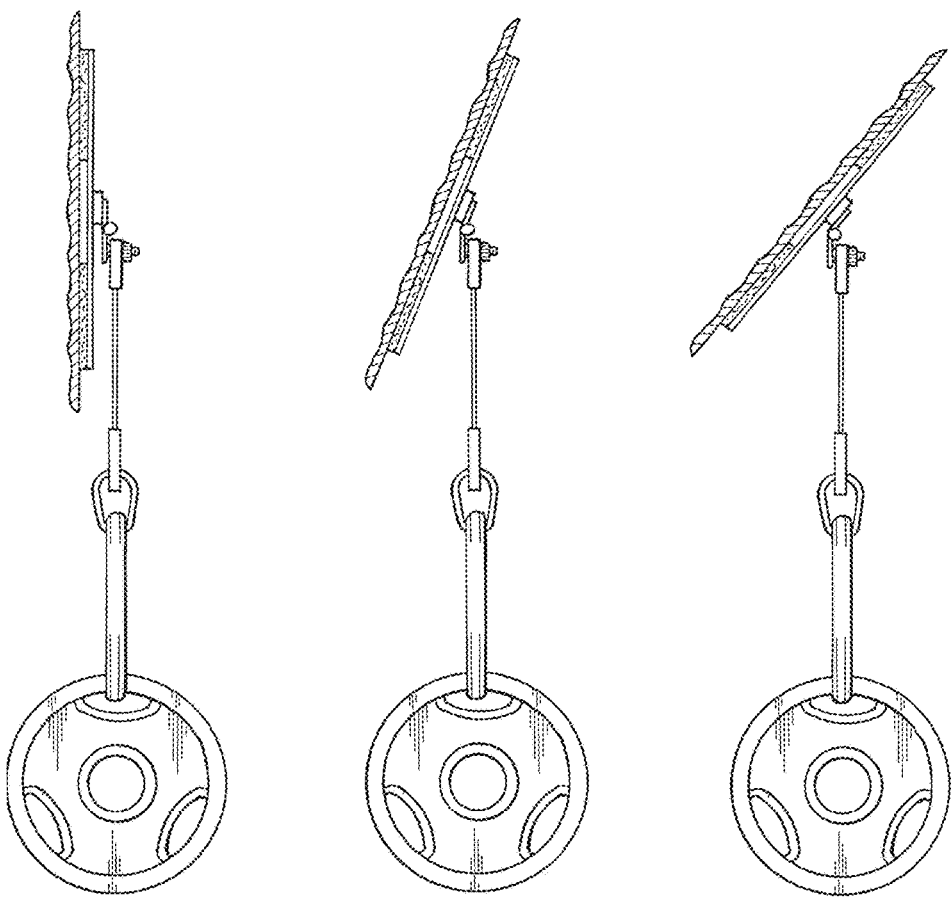
FIGS. 22a, 22b, 22c, 22d and 22e show an exemplary adhesive device of the invention supporting 5 lbs of weight as the substrate is rotated about the x axis.
Figure 22D:
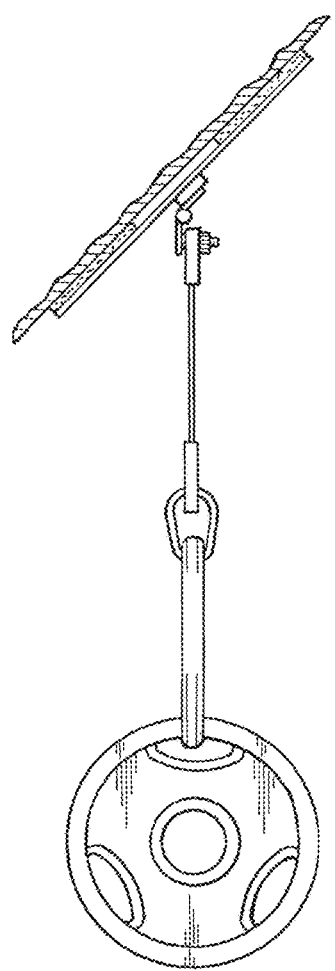
Figure 22E:
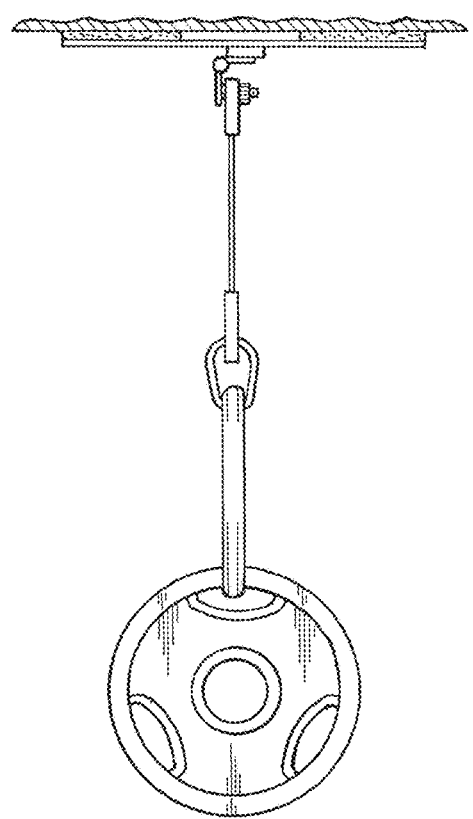
Figures 23A, 23B, 23C:
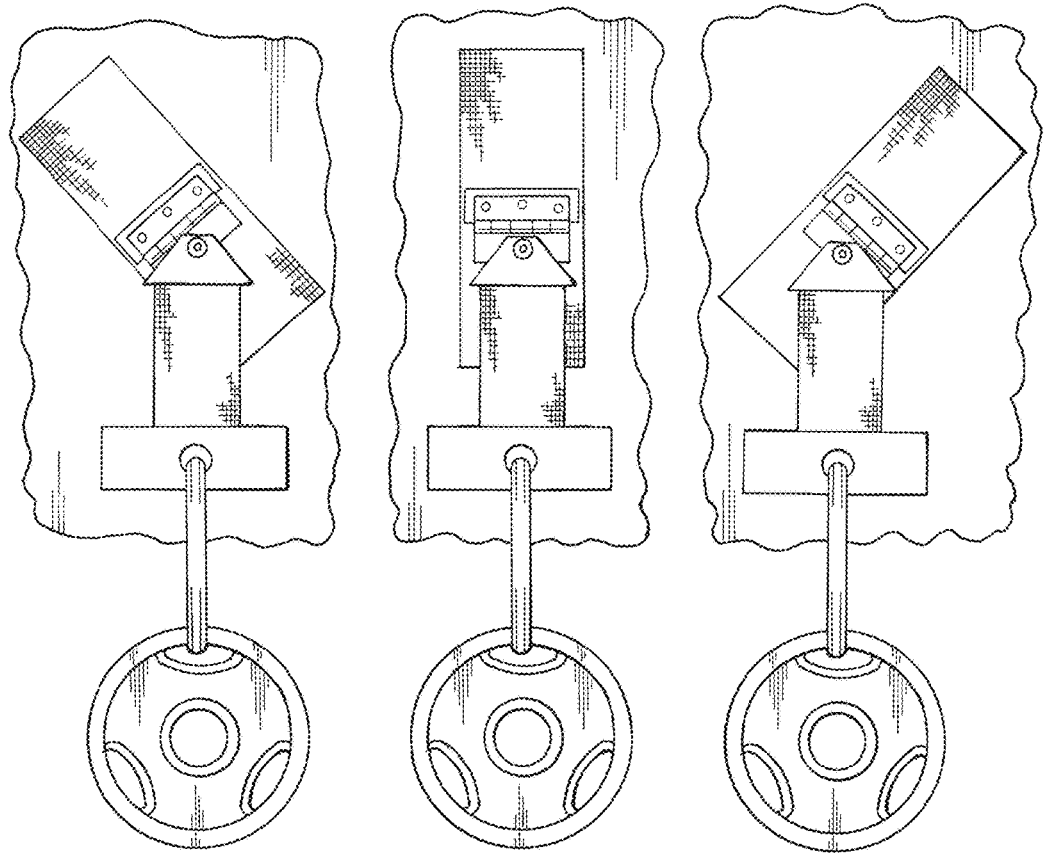
FIGS. 23a, 23b and 23c show an exemplary adhesive device of the invention supporting 5 lbs of weight as the substrate is rotated about the z axis.
Figure 24:
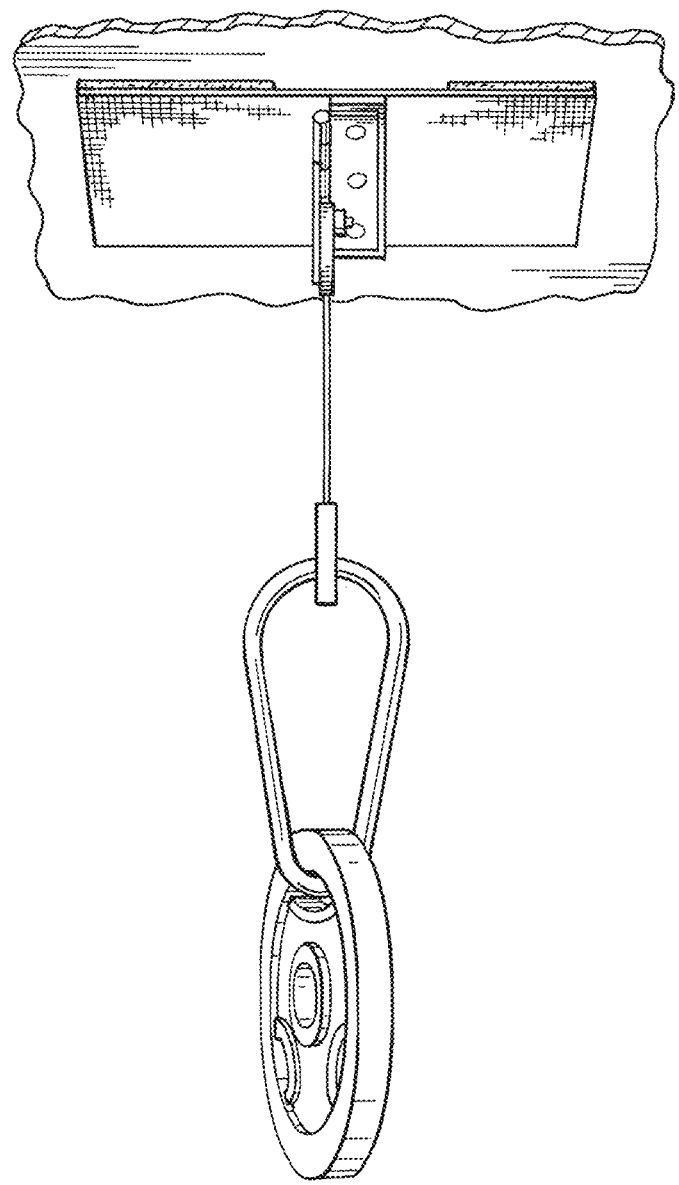
FIG. 24 shows an exemplary adhesive device of the invention supporting 5 lbs of weight as the substrate is rotated about the x and z axes.

FIG. 16 shows an exemplary assembly line roll-to-roll process for creating complex skin systems. A roll of fabric, planar or non-planar tether can be installed, and a doctor blade would apply a continuous volume of elastomer to the fabric in a controlled width and thickness. This fabric, planar or non-planar tether would pass through an oven to cure the elastomer either thermally or optically (utilizing ultraviolet light). The fabric, planar or non-planar tether could then either be cut and binned, or rolled back onto another roll for transportation.

In one aspect, the invention generally relates to a releasable, surface-adhesive device. The device includes: a first adhesive pad, a second adhesive pad, a tether component, and a hinge component attached to the tether component. The first adhesive pad includes: a first planar backing layer having high in-plane stiffness; and a first planar layer of an elastic material having a first adhesive surface on at least one side for adhering to a first target surface, wherein the elastic material is impregnated onto the first planar backing layer on at least the side opposing the first adhesive surface. The second adhesive pad includes: a second planar backing layer having high in-plane stiffness; and a second planar layer of an elastic material having a second adhesive surface on at least one side for adhering to a second target surface, wherein the elastic material is impregnated onto the second planar backing layer on at least the side opposing the second adhesive surface. In certain preferred embodiments, the tether component has a proximal end and a distal end, respectively attached to the first and second planar backing layers. The hinge is rotatable along at least one rotational axis resulting in the hinge component forming an angle with the tether component in the range from about 0° to about 359° (e.g., 30°, 45°, 60°, 90°, 120°, 150°, 180°, 210°, 240°, 270°, 300°, 330°). It is noted that, in certain embodiments, a tether component and a backing layer together form a continuous component, e.g., by stitching or other connections, or because of being parts of a single piece of fabric, for example.

In certain preferred embodiments, the device includes a first and a second adhesive pads, wherein the first planar backing layer is impregnated onto the first layer of the elastic material on the side opposing the first adhesive surface; and the second planar backing layer is impregnated onto the second layer of the elastic material on the side opposing the second adhesive surface.

In certain embodiments, the hinge component is attached substantially at the center between the first and second adhesive pads. In certain embodiments, the hinge component is attached other than substantially at the center between the first and second adhesive pads. In certain embodiments, the hinge component is permanently connected to a weight-bearing handle. In certain embodiments, the hinge component is releasably attached to a weight-bearing handle.

In certain preferred embodiments, the hinge component comprises a hinge attached to a rigid base, wherein the rigid base is attached to the tether component. In certain preferred embodiments, the hinge is made of one or more material selected from metallic, plastic and wood. Additionally, the hinge and the base may be separate components or may be parts of a single component. In certain embodiments, a hinge may be utilized directly without a rigid base.

The tether component may be attached to the first and second adhesive pads such that the first and second adhesive surfaces reside on the same side of the tether component. In certain embodiments, the hinge component is attached to the tether component from the same side as the first and second adhesive surfaces. In certain embodiments, the hinge component is attached to the tether component from the opposite side as the first and second adhesive surfaces. It is noted that the tether component may be a single piece or may itself include two or more parts joined together.

The tether component may also be attached to the first and second adhesive pads such that the first and second adhesive surfaces reside on different sides of the tether component.

In some embodiments, the first planar backing layer of the first adhesive pad, the tether component, and the second planar backing layer of the second adhesive pad together consecutively form a single continuous planar component. In some other embodiments, the first planar backing layer of the first adhesive pad and the tether component together form a single continuous planar component, and the second planar backing layer of the second adhesive pad and the tether component do not form a single continuous planar component. In yet other embodiments, the first planar backing layer of the first adhesive pad, the tether component, and the second planar backing layer of the second adhesive pad together consecutively does not form a single continuous planar component.

In some embodiments, the proximal end of the tether component is attached substantially at the center of the backing layer of the first adhesive pad, and the distal end of the tether component is attached substantially at the center of the backing layer of the second adhesive pad. In some embodiments, the proximal end of the tether component is attached substantially away from the center of the backing layer of the first adhesive pad, and the distal end of the tether component is attached substantially away from the center of the backing layer of the second adhesive pad. In some embodiments, the proximal end of the tether component is attached substantially at the center of the backing layer of the first adhesive pad, and the distal end of the tether component is attached substantially away from the center of the backing layer of the second adhesive pad.

The tether component may be made from any suitable material, such as a fabric material or a non-fabric material. In certain embodiments, the tether component is planar. In certain other embodiments, the tether component is or non-planar.

In another aspect, the invention generally relates to a releasable, surface-adhesive device. The device includes: a planar backing layer having high in-plane stiffness; a first layer of an elastic material having on one side a first adhesive surface for adhering to a target surface and on the other side impregnating into the planar backing layer; a second layer of an elastic material having on one side a second adhesive surface for adhering to a target surface and on the other side impregnating into the planar backing layer; and a hinge attached to the planar backing layer directly or via a rigid substrate.

In some preferred embodiments, each adhesive surface is microscopically or nanoscopically smooth. In some preferred embodiments, each adhesive surface is microscopically or nanoscopically patterned.

In certain preferred embodiments, each backing layer is a fabric backing layer.

In certain embodiments, each planar layer of the elastic material has a smooth adhesive surface area from about 0.01 $cm^2$ to about 1000 $cm^2$ (e.g., about 0.01 $cm^2$, 0.05 $cm^2$, 0.1 $cm^2$, 0.5 $cm^2$, 1 $cm^2$, 2 $cm^2$, 5 $cm^2$, 10 $cm^2$, 20 $cm^2$, 50 $cm^2$, 100 $cm^2$, 200 $cm^2$, 500 $cm^2$, 1,000 $cm^2$) and has a substantially uniform thickness from about 0.0001 cm to about 0.5 cm (e.g., 0.0001 cm, 0.0005 cm, 0.001 cm, 0.005 cm, 0.01 cm, 0.05 cm, 0.1 cm, 0.2, 0.5 cm). In certain embodiments, the planar layer of the elastic material has a smooth adhesive surface area of greater than about 0.01 $cm^2$ and has a substantially uniform thickness of less than about 0.001 cm. In certain embodiments, the planar layer of the elastic material has a smooth adhesive surface area of greater than about 0.05 $cm^2$ and has a substantially uniform thickness of less than about 0.005 cm. In certain embodiments, the planar layer of the elastic material has a smooth adhesive surface area of greater than about 0.1 $cm^2$ and has a substantially uniform thickness of less than about 0.01 cm. In certain embodiments, the planar layer of the elastic material has a smooth adhesive surface area of greater than about 0.2 cm$^2$ and has a substantially uniform thickness of less than about 0.5 cm. In certain embodiments, the planar layer of the elastic material has a smooth adhesive surface area of greater than about 0.5 cm$^2$ and has a substantially uniform thickness of less than about 0.2 cm. In certain embodiments, the planar layer of the elastic material has a smooth adhesive surface area of greater than about 1.0 cm$^2$ and has a substantially uniform thickness of less than about 0.1 cm. In certain embodiments, the planar layer of the elastic material has a smooth adhesive surface area of greater than about 5.0 cm$^2$ and has a substantially uniform thickness of less than about 0.05 cm. In certain embodiments, the planar layer of the elastic material has a smooth adhesive surface area of greater than about 10 cm$^2$ and has a substantially uniform thickness of less than about 0.02 cm. In certain embodiments, the planar layer of the elastic material has a smooth adhesive surface area of greater than about 100 cm$^2$ and has a substantially uniform thickness of less than about 0.01 cm. In certain embodiments, the planar layer of the elastic material has a smooth adhesive surface area from about 10 cm$^2$ to about 100 cm$^2$ and has a substantially uniform thickness from about 0.01 cm to about 0.05 cm. In certain embodiments, the planar layer of the elastic material has a smooth adhesive surface area from about 1,000 cm$^2$ to about 100 cm$^2$ and has a substantially uniform thickness from about 0.5 cm to about 0.05 cm.

In certain embodiments, the elastic material has an elastic modulus from about 0.05 MPa to about 50 MPa (e.g., 0.05 MPa, 0.1 MPa, 0.5 MPa, 1.0 MPa, 5.0 MPa, 10 MPa, 15 MPa, 20 MPa, 30 MPa, 40 MPa, 50 MPa). In certain embodiments, the elastic material has an elastic modulus from about 0.05 MPa to about 50 MPa. In certain embodiments, the elastic material has an elastic modulus from about 0.05 MPa to about 30 MPa. In certain embodiments, the elastic material has an elastic modulus from about 0.05 MPa to about 10 MPa. In certain embodiments, the elastic material has an elastic modulus from about 1 MPa to about 50 MPa. In certain embodiments, the elastic material has an elastic modulus from about 1 MPa to about 30 MPa. In certain embodiments, the elastic material has an elastic modulus from about 1 MPa to about 10 MPa.

In yet another aspect, the invention generally relates to an adhesive device assembly comprises two or more releasable, surface-adhesive devices of the invention disclosed herein, wherein the two or more releasable, surface-adhesive devices are mechanically joined and are configured to connect to a hinge component rotatable along at least one rotational axis resulting in the hinge component forming an angle with a target surface in the range from about 0° to about 180°.

In yet another aspect, the invention generally relates to a method for releasably holding a weight. The method includes providing a releasable, surface-adhesive device according to disclosed and attaching a weight to the device.

Adhesive surfaces may be microscopically or nanoscopically smooth or patterned, for example. A backing layer may be a fabric backing layer. A planar layer of an elastic material may comprise the same elastic material or different elastic materials.

Each layer of the elastic material may have any desirable shape including a substantially circular outer boundary, a substantially rectangular outer boundary, a substantially irregular outer boundary, a substantially elliptical outer boundary, for examples.

In certain preferred embodiments, the elastic material is a block copolymer elastomer.

In certain preferred embodiments, the elastic material comprises one or more of siloxane-based elastomers, urethane-based elastomers, and acrylate-based elastomers.

In some embodiments, each layer of an elastic material comprises two or more separate smaller elastic material layer units.

The fabric backing layer may include a natural fabric material (e.g., cotton, hemp, wool, silk, bamboo string, cellulose, jute, and pina). The fabric backing layer may also include a synthetic fabric material (e.g., polyester, spandex, nylon, carbon fiber, polyaramid, carbon fiber polyaramid hybrid, carbon fiber basalt hybrid, fiberglass, carbon fiber, or fiberglass hybrid).

In certain embodiments, one or more of the adhesive surfaces may have an area of about 1 cm$^2$ or greater and is capable of bearing a weight of at least 31.5 N per 1 cm$^2$ of adhesive surface area.

In certain embodiments, one or more of the adhesive surfaces may have an area of about 1 cm$^2$ or greater and is capable of bearing a weight of at least 12 N per 1 cm$^2$ of adhesive surface area.

In certain embodiments, one or more of the adhesive surfaces may have an area of about 100 cm$^2$ or greater and is capable of bearing a weight of at least 3150 N per 100 cm$^2$ of adhesive surface area.

In certain embodiments, one or more of the adhesive surfaces may have an area of about 100 cm$^2$ or greater and is capable of bearing a weight of at least 1200 N per 100 cm$^2$ of adhesive surface area.

In certain embodiments, each tether component includes a fabric material. In certain other embodiments, at least one tether component includes a non-fabric material.

The target surface may be any suitable surfaces including that of glass, metal, wood, plastic, paper, cardboard, or concrete.

It is noted that the term "backing", as used herein, includes but is not limited to the situation where the referred to layer or material is the back (or the last) layer of the device structure. According to this invention, a backing layer may be an interior layer or component of a structural arrangement.

Elastic materials that may be used in the adhesive pads include siloxane-based elastomers, urethane-based elastomers, and acrylate-based elastomers. Polydimethylsiloxane (PDMS) belongs to a group of polymeric organosilicon compounds that are commonly referred to as silicones. PDMS, widely used silicon-based organic polymer, has preferred rheological (or flow) properties. PDMS is generally inert, non-toxic and non-flammable.

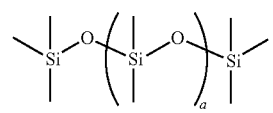

A Polydimethylsiloxane

Other elastic materials that may be used in the adhesive pads include polyurethanes, which are polymers of organic units covalently joined by urethane (carbamate) links.

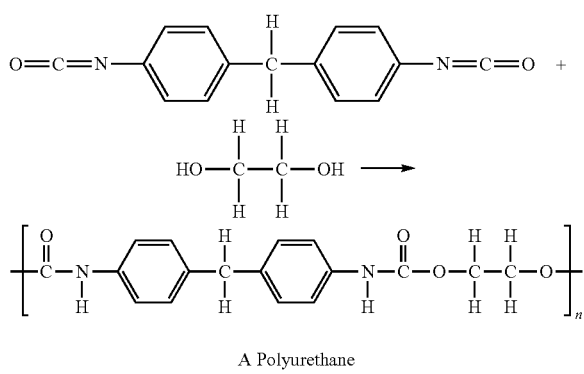

A Polyurethane

A urethane linkage is produced by reacting an isocyanate group, —N=C=O with a hydroxyl group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N=C=O)$_n$, $\geq 2$ and a polyol is a molecule with two or more hydroxyl functional groups, R'—(OH)$_n$, $\geq 2$. The reaction product is a polymer containing the urethane linkage, —RNHCOOR'—. Examples of polyurethane monomers ("pre-polymers") includes hydroxyl ended molecules, such as polyethylene glycol, polypropylene glycol, poly tetramethylene glycol, or bisphenol A (hydroxyl-containing monomers) and an aliphatic or aromatic based isocyanate, such as methylene diphenyl diisocyanate, toluene diphenyl diisocyanate, hexamethylene diisocyanate, isophorone diisocyanate, or a polyisocyanate resulting from the combination of multiple of these monomers (for example, three molecules of methylene diphenyl diisocyanate form a trimer which contains three isocyanate functional groups).

It is noted that the devices disclosed herein may also be made with materials which typically are found in conventional pressure sensitive adhesives and glues, including viscoelastic materials, which may include siloxanes, polyurethanes, cyanoacrylates, or other viscoelastic materials, as well as tackifiers, stabilizers, and volatile or non-volatile network swelling agents. The present invention includes devices and methods using materials with varying levels of viscoelasticity, for example viscoelastic materials that exhibit full creep recovery.

In certain embodiments, the material of the fabric backing layer includes a natural fabric material or a synthetic fabric material. In certain embodiments, the material of the fabric backing layer includes a natural fabric material such as cotton, hemp, wool, silk, bamboo string, cellulose, jute or pina. In certain embodiments, the material of the fabric backing layer includes a synthetic fabric of polyester, spandex, nylon, carbon fiber, polyaramid, carbon fiber polyaramid hybrid, carbon fiber basalt hybrid, fiberglass, or fiberglass hybrid. In certain preferred embodiments, the material of the fabric backing layer comprises a material selected from the group consisting of nylon, carbon fiber, polyaramid, carbon fiber and polyaramid hybrid.

In certain embodiments, the tether is a fabric material, for example, selected from synthetic fabrics like polyester, spandex, nylon, carbon fiber, polyaramid, carbon fiber polyaramid hybrid, carbon fiber basalt hybrid, fiberglass, carbon fiber, or fiberglass hybrid, and natural fabrics including cotton, hemp, wool, silk, bamboo string, cellulose, jute, and pina. In certain embodiments, the tether is a non-fabric material, for example, selected from leather, metal sheets, plastic sheets, or non-woven textiles. In some embodiments, the material is made from chain-link meshes.

In certain embodiment, the elastic material can extend beyond the fabric layer on the "back side" of the pad. This design may aid the establishment of uniform contact without sacrificing the stiffness of the device that is directly related to the force capacity of the adhesive device.

In certain embodiments, the adjustable angle between a hinge and the target adhesive surface range from about 0° to about 180°, for example, 15°, 30°, 45°, 60°, 90°, 120°, 150°.

In certain embodiments, the ratio of storage to loss elastic moduli is at least greater than about 10 (e.g., greater than 15, 20, or 50) at the operating temperature of interest.

The layer of the elastic material may have any size and shape as a particular application requires, for example, it may have a substantially circular outer boundary, a substantially rectangular outer boundary, a substantially elliptical outer boundary, or a substantially irregular outer boundary.

As stated herein, in some embodiments, the layer of an elastic material includes two, three, four or more separate smaller elastic material layer units or structures. The target surface may be any suitable surfaces, including that of glass, metal, wood, plastic, paper, cardboard, or concrete. The two or more adhesive pads may be configured such that they are capable of adhering to target surfaces at arbitrary angles to one another. In some embodiments, the two or more adhesive pads are configured such that they face the same direction. In some embodiments, the two or more adhesive pads are configured such that they face different directions.

Another application that may benefit from the disclosed invention is to connect two (or more) objects with the adhesive device of the invention. For example, a double-sided adhesive device may be used as a connector to connect two heavy objects, each of which has a properly positioned flat surface to apply the adhesive pad to. Thus, the invention also relates to a method for using the double-sided adhesive device disclosed herein to connect two objects with flat surfaces. Once connected, the two or more objects can be moved vertically or horizontally according to the applications.

The integrated adhesive pad approach of the invention provides a robust platform for a wide-variety of applications. For example, these structures can be used to support shelving for books, displays, and electronic appliances (televisions, computers, stereos, monitors, screens); hanging structures; auto trims; among others.

Figure 25:
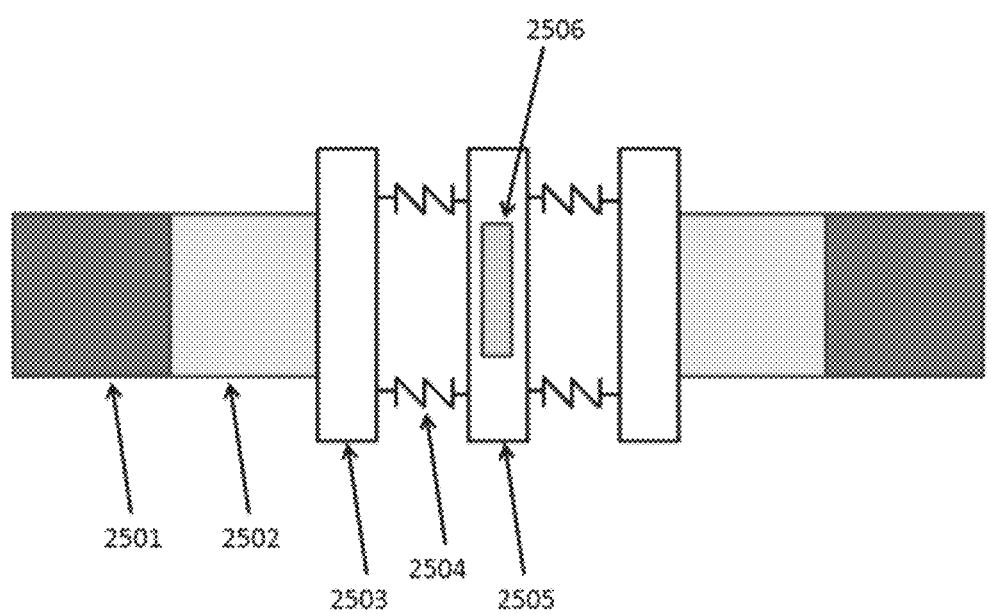
FIG. 25 shows an exemplary adhesive device of the invention having two adhesive pads attached to an intermediate device consisting of a hinge.

In another case, two adhesive pads can be attached to an intermediate device consisting of a hinge (FIG. 25, 2505 and 2506). The entire device consists of two pads consist of an elastic or viscoelastic pad material 2501 attached to a fabric tether backing layer 2502 which is attached to an anchor point which could be made out of polycarbonate 2503. This may be attached with springs, hydraulics, adhered fabrics, or rivets, for example 2504, to the independent attachment hinge, which may be a piece of poly carbonate 2505 containing a hinge, or directly to a hinge 2506. This hinge can be mechanical like a pin or ball and socket joint, or it could consist of stitched fabric, buttons, or zippers, for example.

EXAMPLES

To a piece of fabric, adhesive material is applied to both the proximal and distal end, and is cured. A mechanical hinge is attached substantially in the middle using an adhesive, for example cyanoacrylate-based adhesives. A modular tendon is then connected to this mechanical hinge, which can support a clip to hold weight. This allows the adhesive to rotate about the mechanical hinge, and support weight at a variety of angles.

A rigid piece of material is adhered, using an adhesive (for example cyanoacrylate-based adhesives), to fabric at either end to support weight. To allow for multiple angles, the rigid material is cut at angles to form angles for rotation. A hole is drilled at the apex of the triangle which acts as the point of rotation.

To a piece of fabric, adhesive material is applied to both the proximal and distal end, and is cured. A mechanical hinge is attached substantially in the middle using using an adhesive, for example cyanoacrylate-based adhesives. To a second piece of fabric, adhesive material is applied to both the proximal and distal end, and is cured. A mechanical hinge is attached substantially in the middle here also using an adhesive, for example cyanoacrylate-based adhesives. An intermediate tendon is created by adhering a rigid material to the fabric, and this rigid material is connected to the mechanical hinges of the first two pieces of fabric. From this intermediate tendon weight can be supported.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A releasable surface-adhesive device comprising:
   a first adhesive pad having a first adhering surface on at least one side for adhering to a first target surface;
   a second adhesive pad having a second adhering surface on at least one side for adhering to a second target surface;
   a tether attached to and extending between the first adhesive pad and the second adhesive pad; and
   a hinge attached to the tether at a location between the first and second adhesive pads.

2. The releasable surface-adhesive device of claim 1, wherein the first adhesive pad, second adhesive pad, and the tether form a single continuous planar component.

3. The releasable surface-adhesive device of claim 1, wherein the first adhering surface and the second adhering surface are located on a first side of the tether.

4. The releasable surface-adhesive device of claim 1, wherein the first adhering surface and the second adhering surface are located on opposing sides of the tether.

5. The releasable surface-adhesive device of claim 1, further comprising a handle connected to the hinge.

6. The releasable surface-adhesive device of claim 1, wherein the first adhesive pad comprises a first planar backing layer and a first elastic planar layer, wherein the first elastic planar layer forms the first adhering surface on at least one side and the first elastic planar layer is applied to the first planar backing layer on at least a side opposing the first adhering surface, and wherein the second adhesive pad comprises a second planar backing layer and a second elastic planar layer, wherein the second elastic planar layer forms the second adhering surface on at least one side and wherein the second elastic planar layer is applied to the second planar backing layer on at least a side opposing the second adhering surface.

7. The releasable surface-adhesive device of claim 6, wherein the first planar backing layer, the second planar backing layer, and the tether are a single continuous layer.

8. The releasable surface-adhesive device of claim 6, wherein the first planar backing layer has a higher in-plane stiffness than the first elastic planar layer, and wherein the second planar backing layer has a higher in-plane stiffness than the second elastic planar layer.

9. The releasable surface-adhesive device of claim 1, wherein the hinge is attached away from a center of the tether between the first and second adhesive pads.

10. The releasable surface-adhesive device of claim 1, further comprising a rigid substrate, wherein the hinge is attached to the rigid substrate and the rigid substrate is attached to the tether.

11. The releasable surface-adhesive device of claim 1, wherein the tether is attached away from a center of at least one of the first adhesive pad and the second adhesive pad.

12. The releasable surface-adhesive device of claim 1, wherein the hinge is rotatable along at least one rotational axis to form an angle with the tether between 0° and 359°.

13. A releasable surface-adhesive device comprising:
    at least one adhesive pad, wherein each adhesive pad comprises:
       a planar backing layer; and
       a first elastic planar layer that forms an adhering surface on at least one side and wherein the elastic planar layer is applied to the planar backing layer on at least a side opposing the adhering surface;
    a tether attached to the at least one adhesive pad; and
    a hinge attached to the tether.

14. The releasable surface-adhesive device of claim 13, wherein the at least one adhesive pad is at least two adhesive pads, and wherein the hinge is attached to the tether at a location between the at least two adhesive pads.

15. The releasable surface-adhesive device of claim 14, wherein the at least two adhesive pads include more than two adhesive pads.

16. The releasable surface-adhesive device of claim 14, wherein the adhering surfaces of the at least two adhesive pads are located on a first side of the tether.

17. The releasable surface-adhesive device of claim 14, wherein the adhering surfaces of the at least two adhesive pads are located on opposing sides of the tether.

18. The releasable surface-adhesive device of claim 14, wherein the at least two adhesive pads and the tether form a single continuous planar component.

19. The releasable surface-adhesive device of claim 14, wherein the hinge is attached away from a center of the tether between the at least two adhesive pads.

20. The releasable surface-adhesive device of claim 13, further comprising a handle connected to the hinge.

21. The releasable surface-adhesive device of claim 13, wherein the planar backing layer of the at least one adhesive pad and the tether are a single continuous layer.

22. The releasable surface-adhesive device of claim 13, wherein the planar backing layer of the at least one adhesive pad has a higher in-plane stiffness than the elastic planar layer of the at least one adhesive pad.

23. The releasable surface-adhesive device of claim 13, wherein the hinge is rotatable along at least one rotational axis to form an angle with the tether between 0° to 359°.

\* \* \* \* \*